(12) United States Patent
Murofushi

(10) Patent No.: US 6,781,514 B2
(45) Date of Patent: Aug. 24, 2004

(54) ELECTRONIC SHELF LABEL SYSTEM

(75) Inventor: Nobuo Murofushi, Susono (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 106 days.

(21) Appl. No.: 09/759,896

(22) Filed: Jan. 12, 2001

(65) Prior Publication Data

US 2002/0002421 A1 Jan. 3, 2002

(30) Foreign Application Priority Data

Jan. 17, 2000 (JP) ........................................ 2000-007899

(51) Int. Cl.$^7$ ............................................. G08B 21/00
(52) U.S. Cl. .................... 340/636.1; 340/660; 340/663; 340/539.1
(58) Field of Search ................................ 340/636, 539, 340/657, 658, 660, 663, 636.1, 539.1

(56) References Cited

U.S. PATENT DOCUMENTS 5,539,393 A   7/1996   Barfod
5,697,061 A   12/1997  Krueger et al.
5,704,049 A   12/1997  Briechle
2002/0065726 A1 * 5/2002  Bhyravabhotla ............. 705/20

FOREIGN PATENT DOCUMENTS

| EP | 0 713 196 A2 | 5/1996 |
| EP | 0764912 A2 | 3/1997 |
| EP | 0764 912 A2 * | 3/1997 |
| JP | 9-138892 | 5/1997 |
| JP | 9-138892 * | 9/1997 |

* cited by examiner

*Primary Examiner*—Julie Lieu
(74) *Attorney, Agent, or Firm*—Frishauf, Holtz, Goodman & Chick, P.C.

(57) ABSTRACT

If an electronic shelf label server receives a replacement request from each of the electronic shelf labels, a date of a corresponding electronic shelf label number is read out from a database and an object range is determined based on this date. Then, whether or not a date corresponding to the electronic shelf label number is within the determined object range is determined so as to specify an electronic shelf label which should be replaced. Information of this specified electronic shelf label is displayed on a display.

8 Claims, 17 Drawing Sheets

| ELECTRONIC SHELF LABEL NUMBER | DATE | INFORMATION A | INFORMATION B | INFORMATION C | INFORMATION D | INFORMATION E |
|---|---|---|---|---|---|---|
| 1 | 1999.10.2 | ----- | ----- | ----- | ----- | ----- |
| 2 | 1999.10.2 | ----- | ----- | ----- | ----- | ----- |
| 3 | 1999.10.2 | ----- | ----- | ----- | ----- | ----- |
| --- | --- | --- | --- | --- | --- | --- |
| 5052 | 1999.10.2 | ----- | ----- | ----- | ----- | ----- |
| 5053 | 1999.10.15 | ----- | ----- | ----- | ----- | ----- |
| 5054 | 1999.10.15 | ----- | ----- | ----- | ----- | ----- |
| 5055 | 1999.10.15 | ----- | ----- | ----- | ----- | ----- |
| 5056 | 1999.10.15 | ----- | ----- | ----- | ----- | ----- |
| --- | --- | --- | --- | --- | --- | --- |
| 6548 | 1999.10.15 | ----- | ----- | ----- | ----- | ----- |
| 6549 | 1999.12.10 | ----- | ----- | ----- | ----- | ----- |
| 6550 | 1999.12.10 | ----- | ----- | ----- | ----- | ----- |
| --- | --- | --- | --- | --- | --- | --- |
| 8572 | 1999.12.20 | ----- | ----- | ----- | ----- | ----- |

FIG. 3

| ELECTRONIC SHELF LABEL NUMBER | DATE | INITIAL POWER CAPACITY | INFORMATION A | INFORMATION B | INFORMATION C | INFORMATION D | INFORMATION E |
|---|---|---|---|---|---|---|---|
| 1 | 1999.10.2 | --- | --- | --- | --- | --- | --- |
| 2 | 1999.10.2 | --- | --- | --- | --- | --- | --- |
| 3 | 1999.10.2 | --- | --- | --- | --- | --- | --- |
| --- | --- | --- | --- | --- | --- | --- | --- |
| 5052 | 1999.10.2 | --- | --- | --- | --- | --- | --- |
| 5053 | 1999.10.15 | --- | --- | --- | --- | --- | --- |
| 5054 | 1999.10.15 | --- | --- | --- | --- | --- | --- |
| 5055 | 1999.10.15 | --- | --- | --- | --- | --- | --- |
| 5056 | 1999.10.15 | --- | --- | --- | --- | --- | --- |
| --- | --- | --- | --- | --- | --- | --- | --- |
| 6548 | 1999.10.15 | --- | --- | --- | --- | --- | --- |
| 6549 | 1999.12.10 | --- | --- | --- | --- | --- | --- |
| 6550 | 1999.12.10 | --- | --- | --- | --- | --- | --- |
| --- | --- | --- | --- | --- | --- | --- | --- |
| 8572 | 1999.12.20 | --- | --- | --- | --- | --- | --- |

FIG. 5

| ELECTRONIC SHELF LABEL NUMBER | WIRELESS COMMUNICATION BASE STATION NUMBER | WIRELESS COMMUNICATION BASE STATION TRANSMISSION FREQUENCY | INFORMATION A | INFORMATION B | INFORMATION C | INFORMATION D | INFORMATION E |
|---|---|---|---|---|---|---|---|
| 1 | 1 | 5058921 | --- | --- | --- | --- | --- |
| 2 | 1 | 5058921 | --- | --- | --- | --- | --- |
| 3 | 1 | 5058921 | --- | --- | --- | --- | --- |
| --- | --- | --- | --- | --- | --- | --- | --- |
| 5052 | 14 | 5932648 | --- | --- | --- | --- | --- |
| 5053 | 14 | 5932648 | --- | --- | --- | --- | --- |
| 5054 | 14 | 5932648 | --- | --- | --- | --- | --- |
| 5055 | 15 | 4836705 | --- | --- | --- | --- | --- |
| 5056 | 15 | 4836705 | --- | --- | --- | --- | --- |
| --- | --- | --- | --- | --- | --- | --- | --- |
| 6548 | 18 | 3582640 | --- | --- | --- | --- | --- |
| 6549 | 18 | 3582640 | --- | --- | --- | --- | --- |
| 6550 | 18 | 3582640 | --- | --- | --- | --- | --- |
| --- | --- | --- | --- | --- | --- | --- | --- |
| 8572 | 25 | 1451035 | --- | --- | --- | --- | --- |

FIG. 7

| ELECTRONIC SHELF LABEL NUMBER | WIRELESS COMMUNICATION BASE STATION NUMBER | WIRELESS COMMUNICATION BASE STATION TRANSMISSION FREQUENCY | INITIAL POWER CAPACITY | INFORMATION A | INFORMATION B | INFORMATION C | INFORMATION D | INFORMATION E |
|---|---|---|---|---|---|---|---|---|
| 1 | 1 | 5058921 | --- | --- | --- | --- | --- | --- |
| 2 | 1 | 5058921 | --- | --- | --- | --- | --- | --- |
| 3 | 1 | 5058921 | --- | --- | --- | --- | --- | --- |
| --- | --- | --- | --- | --- | --- | --- | --- | --- |
| 5052 | 14 | 5932648 | --- | --- | --- | --- | --- | --- |
| 5053 | 14 | 5932648 | --- | --- | --- | --- | --- | --- |
| 5054 | 14 | 5932648 | --- | --- | --- | --- | --- | --- |
| 5055 | 15 | 4836705 | --- | --- | --- | --- | --- | --- |
| 5056 | 15 | 4836705 | --- | --- | --- | --- | --- | --- |
| --- | --- | --- | --- | --- | --- | --- | --- | --- |
| 6548 | 18 | 3582640 | --- | --- | --- | --- | --- | --- |
| 6549 | 18 | 3582640 | --- | --- | --- | --- | --- | --- |
| 6550 | 18 | 3582640 | --- | --- | --- | --- | --- | --- |
| --- | --- | --- | --- | --- | --- | --- | --- | --- |
| 8572 | 25 | 1451035 | --- | --- | --- | --- | --- | --- |

123

F I G. 9

| ELECTRONIC SHELF LABEL NUMBER | ELECTRONIC SHELF LABEL RECEPTION FREQUENCY | INFORMATION A | INFORMATION B | INFORMATION C | INFORMATION D | INFORMATION E |
|---|---|---|---|---|---|---|
| 1 | 5058921 | --- | --- | --- | --- | --- |
| 2 | 5108202 | --- | --- | --- | --- | --- |
| 3 | 5025167 | --- | --- | --- | --- | --- |
| --- | --- | --- | --- | --- | --- | --- |
| 5052 | 5932648 | --- | --- | --- | --- | --- |
| 5053 | 6532844 | --- | --- | --- | --- | --- |
| 5054 | 5326482 | --- | --- | --- | --- | --- |
| 5055 | 4836705 | --- | --- | --- | --- | --- |
| 5056 | 4326458 | --- | --- | --- | --- | --- |
| --- | --- | --- | --- | --- | --- | --- |
| 6548 | 3582640 | --- | --- | --- | --- | --- |
| 6549 | 6325842 | --- | --- | --- | --- | --- |
| 6550 | 3565408 | --- | --- | --- | --- | --- |
| --- | --- | --- | --- | --- | --- | --- |
| 8572 | 1451035 | --- | --- | --- | --- | --- |

124

F I G. 10

| ELECTRONIC SHELF LABEL NUMBER | ELECTRONIC SHELF LABEL RECEPTION FREQUENCY | INITIAL POWER CAPACITY | INFORMATION A | INFORMATION B | INFORMATION C | INFORMATION D | INFORMATION E |
|---|---|---|---|---|---|---|---|
| 1 | 5058921 | --- | --- | --- | --- | --- | --- |
| 2 | 5108202 | --- | --- | --- | --- | --- | --- |
| 3 | 5025167 | --- | --- | --- | --- | --- | --- |
| --- | --- | --- | --- | --- | --- | --- | --- |
| 5052 | 5932648 | --- | --- | --- | --- | --- | --- |
| 5053 | 6532844 | --- | --- | --- | --- | --- | --- |
| 5054 | 5326482 | --- | --- | --- | --- | --- | --- |
| 5055 | 4836705 | --- | --- | --- | --- | --- | --- |
| 5056 | 4326458 | --- | --- | --- | --- | --- | --- |
| --- | --- | --- | --- | --- | --- | --- | --- |
| 6548 | 3582640 | --- | --- | --- | --- | --- | --- |
| 6549 | 6325842 | --- | --- | --- | --- | --- | --- |
| 6550 | 3565408 | --- | --- | --- | --- | --- | --- |
| --- | --- | --- | --- | --- | --- | --- | --- |
| 8572 | 1451035 | --- | --- | --- | --- | --- | --- |

FIG. 12

| ELECTRONIC SHELF LABEL NUMBER | ELECTRONIC SHELF LABEL TRANSMISSION FREQUENCY | INFORMATION A | INFORMATION B | INFORMATION C | INFORMATION D | INFORMATION E |
|---|---|---|---|---|---|---|
| 1 | 5203 | ----- | ----- | ----- | ----- | ----- |
| 2 | 4930 | ----- | ----- | ----- | ----- | ----- |
| 3 | 5750 | ----- | ----- | ----- | ----- | ----- |
| --- | --- | --- | --- | --- | --- | --- |
| 5052 | 2505 | ----- | ----- | ----- | ----- | ----- |
| 5053 | 6231 | ----- | ----- | ----- | ----- | ----- |
| 5054 | 3327 | ----- | ----- | ----- | ----- | ----- |
| 5055 | 4257 | ----- | ----- | ----- | ----- | ----- |
| 5056 | 5526 | ----- | ----- | ----- | ----- | ----- |
| --- | --- | --- | --- | --- | --- | --- |
| 6548 | 5024 | ----- | ----- | ----- | ----- | ----- |
| 6549 | 4923 | ----- | ----- | ----- | ----- | ----- |
| 6550 | 2621 | ----- | ----- | ----- | ----- | ----- |
| --- | --- | --- | --- | --- | --- | --- |
| 8572 | 1635 | ----- | ----- | ----- | ----- | ----- |

| ELECTRONIC SHELF LABEL NUMBER | ELECTRONIC SHELF LABEL TRANSMISSION FREQUENCY | INITIAL POWER CAPACITY | INFORMATION A | INFORMATION B | INFORMATION C | INFORMATION D | INFORMATION E |
|---|---|---|---|---|---|---|---|
| 1 | 5203 | --- | --- | --- | --- | --- | --- |
| 2 | 4930 | --- | --- | --- | --- | --- | --- |
| 3 | 5750 | --- | --- | --- | --- | --- | --- |
| --- | --- | --- | --- | --- | --- | --- | --- |
| 5052 | 2505 | --- | --- | --- | --- | --- | --- |
| 5053 | 6231 | --- | --- | --- | --- | --- | --- |
| 5054 | 3327 | --- | --- | --- | --- | --- | --- |
| 5055 | 4257 | --- | --- | --- | --- | --- | --- |
| 5056 | 5526 | --- | --- | --- | --- | --- | --- |
| --- | --- | --- | --- | --- | --- | --- | --- |
| 6548 | 5024 | --- | --- | --- | --- | --- | --- |
| 6549 | 4923 | --- | --- | --- | --- | --- | --- |
| 6550 | 2621 | --- | --- | --- | --- | --- | --- |
| --- | --- | --- | --- | --- | --- | --- | --- |
| 8572 | 1635 | --- | --- | --- | --- | --- | --- |

FIG. 15

| ELECTRONIC SHELF LABEL NUMBER | DATE | ELECTRONIC SHELF LABEL RECEPTION FREQUENCY | ELECTRONIC SHELF LABEL TRANSMISSION FREQUENCY | INFORMATION A | INFORMATION B | INFORMATION C | INFORMATION D | INFORMATION E |
|---|---|---|---|---|---|---|---|---|
| 1 | 1999.10.2 | 5058921 | 5203 | ----- | ----- | ----- | ----- | ----- |
| 2 | 1999.10.2 | 5108202 | 4930 | ----- | ----- | ----- | ----- | ----- |
| 3 | 1999.10.2 | 5025167 | 5750 | ----- | ----- | ----- | ----- | ----- |
| --- | --- | --- | --- | --- | --- | --- | --- | --- |
| 5052 | 1999.10.2 | 5932648 | 2505 | ----- | ----- | ----- | ----- | ----- |
| 5053 | 1999.10.15 | 6532844 | 6231 | ----- | ----- | ----- | ----- | ----- |
| 5054 | 1999.10.15 | 5326482 | 3327 | ----- | ----- | ----- | ----- | ----- |
| 5055 | 1999.10.15 | 4836705 | 4257 | ----- | ----- | ----- | ----- | ----- |
| 5056 | 1999.10.15 | 4326458 | 5526 | ----- | ----- | ----- | ----- | ----- |
| --- | --- | --- | --- | --- | --- | --- | --- | --- |
| 6548 | 1999.10.15 | 3582640 | 5024 | ----- | ----- | ----- | ----- | ----- |
| 6549 | 1999.12.10 | 6325842 | 4923 | ----- | ----- | ----- | ----- | ----- |
| 6550 | 1999.12.10 | 3565408 | 2621 | ----- | ----- | ----- | ----- | ----- |
| --- | --- | --- | --- | --- | --- | --- | --- | --- |
| 8572 | 1999.12.20 | 1451035 | 1635 | ----- | ----- | ----- | ----- | ----- |

FIG. 16

| ELECTRONIC SHELF LABEL NUMBER | DATE | ELECTRONIC SHELF LABEL RECEPTION FREQUENCY | ELECTRONIC SHELF LABEL TRANSMISSION FREQUENCY | INITIAL POWER CAPACITY | INFORMATION A | INFORMATION B | INFORMATION C | INFORMATION D | INFORMATION E |
|---|---|---|---|---|---|---|---|---|---|
| 1 | 1999.10.2 | 5058921 | 5203 | --- | --- | --- | --- | --- | --- |
| 2 | 1999.10.2 | 5108202 | 4930 | --- | --- | --- | --- | --- | --- |
| 3 | 1999.10.2 | 5025167 | 5750 | --- | --- | --- | --- | --- | --- |
| --- | --- | --- | --- | --- | --- | --- | --- | --- | --- |
| 5052 | 1999.10.15 | 5932648 | 2505 | --- | --- | --- | --- | --- | --- |
| 5053 | 1999.10.15 | 6532844 | 6231 | --- | --- | --- | --- | --- | --- |
| 5054 | 1999.10.15 | 5326482 | 3327 | --- | --- | --- | --- | --- | --- |
| 5055 | 1999.10.15 | 4836705 | 4257 | --- | --- | --- | --- | --- | --- |
| 5056 | 1999.10.15 | 4326458 | 5526 | --- | --- | --- | --- | --- | --- |
| --- | --- | --- | --- | --- | --- | --- | --- | --- | --- |
| 6548 | 1999.10.15 | 3582640 | 5024 | --- | --- | --- | --- | --- | --- |
| 6549 | 1999.12.10 | 6325842 | 4923 | --- | --- | --- | --- | --- | --- |
| 6550 | 1999.12.10 | 3565408 | 2621 | --- | --- | --- | --- | --- | --- |
| --- | --- | --- | --- | --- | --- | --- | --- | --- | --- |
| 8572 | 1999.12.20 | 1451035 | 1635 | --- | --- | --- | --- | --- | --- |

ELECTRONIC SHELF LABEL SYSTEM

CROSS-REFERENCE TO RELATED APPLICATIONS

This application is based upon and claims the benefit of priority from the prior Japanese Patent Application No. 2000-007899, filed Jan. 17, 2000, the entire contents of which are incorporated herein by reference.

BACKGROUND OF THE INVENTION

The present invention relates to electronic shelf label system comprising a plurality of electronic shelf labels each having a display for indicating information about price, stock number and the like of individual commodities and electronic shelf label (ESL) server for managing the respective electronic shelf labels.

A retailer selling commodities and warehouse controlling inventory have shelves for displaying commodities.

Each shelf has a label for indicating information such as price corresponding to each displayed product, quantity of stock and the like. For example in the retailer shop, there are shelves on which products for sale are displayed and labels indicating the prices of those products are disposed.

In recent years, electronic shelf label has been used, in which the product label employs electronics. The electronic shelf label which the retailer uses has an indicator, and this indicator displays a price and the like.

The retailer shop has a plurality of the electronic shelf labels, which are controlled concentratedly by an ESL server.

If a price of a product is changed, the ESL server sends a price change data to an electronic shelf label displaying that product.

If receiving the changed price data, the electronic shelf label changes the price information.

For example, a super market, convenience store or the like may possess several thousand or more electronic shelf labels per shop.

The electronic shelf label needs electronic power for driving the indicator. However, if this power is introduced from commercial power source through power line, wiring layout and electronic shelf label layout are very difficult to make.

To solve this problem, the electronic shelf label contains a battery inside for use as a power supply. However, the battery has a limited service life.

In a store having several hundred to several thousand electronic shelf labels, there is such a problem that if an electronic shelf label having a battery is replaced with a new electronic shelf label each time when the service life of the battery ends, it takes much time and labor thereby keeping low working efficiency.

According to Jpn. Pat. Appln. KOKAI Publication No. 9-138892, a plurality of electronic price indicating labels each having a data file containing age data are disposed, the age data is periodically read from the data file of this electronic price indicating label by computer. If the computer determines that age data is larger than a threshold period preliminarily set by the computer, replacement of the label is instructed.

Meanwhile, although such an electronic price indicating label does not consume so large power when indicating a product price or the like, power consumption increases if it communicates with the computer.

Power consumption changes depending on surrounding temperature environment in which the electronic price indicating labels are disposed.

According to a replacement method for the electronic price indicating label described in the above publication, the computer communicates with the electronic price indicating labels periodically, reads out age data from the electronic price indicating label and compares it with a threshold period. If the age data is larger than the threshold period, the electronic price indicating label is replaced.

Thus, if the battery is accelerated because of communication condition, temperature environment and the like, the service life of the battery may end before the age data becomes larger than the threshold data.

Conversely, if the battery is decelerated because of communication condition, temperature environment and the like, such an event that the service life of the battery has not yet reached its end may occur when the label is replaced because the age data becomes larger than the threshold period.

Further, because the computer reads the age data from data file of the electronic price indicating label periodically and compares the read age data with its threshold period so as to determine whether or not the electronic price indicating label should be replaced, burden on the computer by the processing is increased.

BRIEF SUMMARY OF THE INVENTION

An object of the present invention is to provide an electronic shelf label system in which if an electronic shelf label whose battery power consumption is affected largely by operating days is employed, an electronic shelf label whose battery electric power drops below a predetermined level can be specified and notified easily and securely so as to reduce a processing load of an ESL server.

Another object of the present invention is to provide an electronic shelf label system in which if an electronic shelf label whose battery power consumption is affected largely by operating days is employed, even if initial power capacity of a battery differs from one to another, an electronic shelf label whose battery electric power drops below a predetermined level can be specified and notified easily and securely so as to reduce a processing load of an ESL server.

Still another object of the present invention is to provide an electronic shelf label system in which if battery power consumption by communication processing is larger than power consumption by other processings than communication processing, an electronic shelf label whose battery electric power drops below a predetermined level can be specified and notified easily and securely so as to reduce a processing load of an ESL server.

A further object of the present invention is to provide an electronic shelf label system in which if battery power consumption by communication processing is larger than power consumption by other processings than communication processing, even if initial power capacity of a battery differs from one to another, an electronic shelf label whose battery electric power drops below a predetermined level can be specified and notified easily and securely so as to reduce a processing load of an ESL server.

A still further object of the present invention is to provide an electronic shelf label system in which if battery power consumption is affected largely by both operating days and communication processing, an electronic shelf label whose battery electric power drops below a predetermined level can be specified and notified easily and securely so as to reduce a processing load of an ESL server.

A yet still further object of the present invention is to provide an electronic shelf label system in which if battery power consumption is affected largely by both operating days and communication processing, even if initial power capacity of a battery differs from one to another, an electronic shelf label whose battery electric power drops below a predetermined level can be specified and notified easily and securely so as to reduce a processing load of an ESL server.

A yet still further object of the present invention is to provide an electronic shelf label system in which an electronic shelf label whose battery electric power drops below a predetermined level can be specified and notified easily and securely and that specified electronic shelf label can be notified that it is specified, so as to reduce a processing load of an ESL server.

A further object of the present invention is to provide an electronic shelf label system in which a worker is notified that an electronic shelf label is specified for replacement.

A further object of the present invention is to provide an electronic shelf label in which a worker is notified that an electronic shelf label is specified because its battery remaining power is a little.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a diagram showing a configuration of database of the electronic shelf label according to the first embodiment of the present invention;

FIG. 5 is a diagram showing a configuration of database of the electronic shelf label according to a second embodiment of the present invention;

FIG. 7 is a diagram showing a configuration of database of the electronic shelf label according to a third embodiment of the present invention;

FIG. 9 is a diagram showing a configuration of database of the electronic shelf label according to a fourth embodiment of the present invention;

FIG. 10 is a diagram showing a configuration of database of the electronic shelf label according to a fifth embodiment of the present invention;

FIG. 12 is a diagram showing a configuration of database of the electronic shelf label according to a sixth embodiment of the present invention;

FIG. 13 is a diagram showing a configuration of database of the electronic shelf label according to a seventh embodiment of the present invention;

FIG. 15 is a diagram showing a configuration of database of the electronic shelf label according to an eighth embodiment of the present invention;

FIG. 16 is a diagram showing a configuration of database of the electronic shelf label according to a ninth embodiment of the present invention;

FIG. 18 is a diagram showing a configuration of database of the electronic shelf label according to a tenth embodiment of the present invention.

DETAILED DESCRIPTION OF THE INVENTION (First Embodiment)

Figure 1:
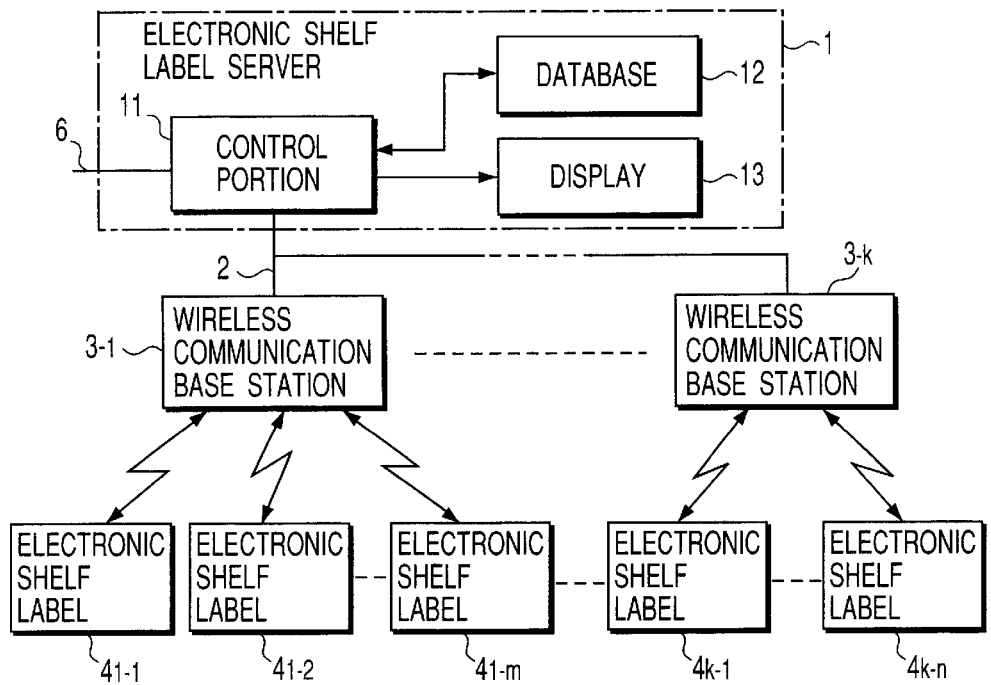
FIG. 1 is a block diagram showing an entire structure of electronic shelf label system according to a first embodiment of the present invention.

As shown in FIG. 1, an ESL server 1 is connected to k wireless communication base stations 3-1–3-$k$ through a communication line 2. The electronic shelf label 4 1-1–4 $k$-$n$ are divided into a plurality groups, and the aforementioned wireless communication base stations 3-1–3-$k$ communicates with plural electronic shelf labels in the same group by radio. For example, the wireless communication base station 3-1 communicates with m electronic shelf labels 4 1-1, 4 1-2, . . . 4 1-$m$ and the wireless communication base station 3-$k$ communicates with n electronic shelf labels 4 $k$-1, . . . 4 $k$-$n$.

The ESL server 1 has a control portion 11, database 12 and display 13. The control portion 11 controls the aforementioned electronic shelf labels 4 1-1, 4 1-2, . . . 4 1-$m$–4 $k$-1, . . . 4 $k$-$n$ through the wireless communication base station 3-1–3-$k$ and further controls the database 12 and the display 13.

The control portion 11 communicates with other apparatuses other than the electronic shelf label through another communication line 6.

If the quantity of the electronic shelf labels is small, this system may include only one wireless communication base station.

Figure 2:
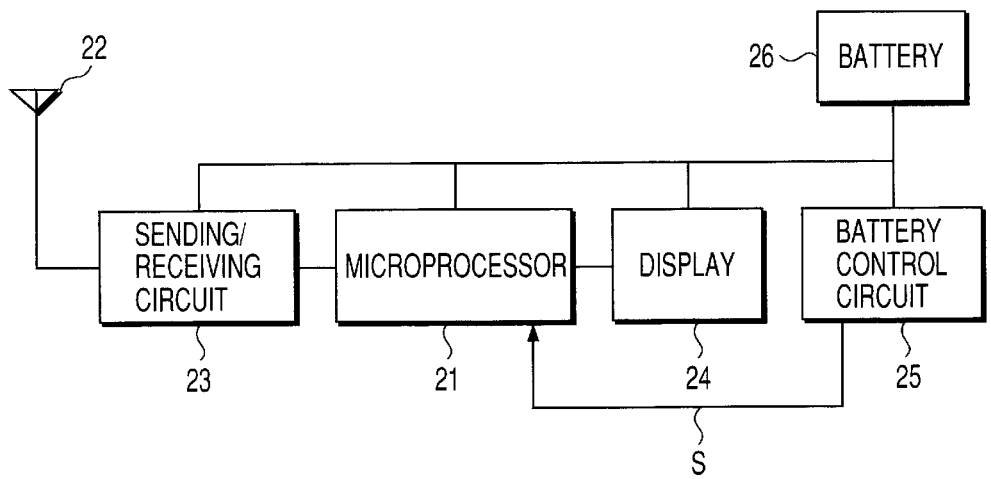
FIG. 2 is a block diagram showing a structure of electronic shelf label according to the first embodiment of the present invention.

The respective electronic shelf labels 4 1-1–4 1-$m$–4 $k$-1–4 $k$-$n$ are placed on the shelves corresponding to commodities displayed on the shelves, for example, individual products. As shown in FIG. 2, each of the electronic shelf labels 4 1-1–4 1-$m$–4 $k$-1–4 $k$-$n$ comprises a microprocessor 21, a sending/receiving circuit 23 for carrying out radio communication with a corresponding radio communication base station through an antenna 22, a display 24 which is controlled by the microprocessor 21 to indicate information relating to each product such as price and quantity of stock, a battery control circuit 25, and a battery 26 for supplying electric power to the microprocessor 21, sending/receiving circuit 23, display 24 and battery control circuit 25.

In the database 12 of the ESL server 1, electronic shelf label numbers given to each of the electronic shelf labels 4 1-1–4 1-m–4 k-1–4 k-n are set up as shown in FIG. 3. The aforementioned database 12 contains a production date information of that electronic shelf label or a date information about a day when the electronic shelf label is installed on a shelf and its operation is started. And it contains information A, B, C, D and E. The information A–E, for example, indicate product name, normal price, bargain price, quantity of stock, and a mating wireless communication base station number which the electronic shelf label communicates with by radio.

According to this electronic shelf label system, if the ESL server 1 communicates with the electronic shelf label 4 1-1, for example, first, the control portion 11 of the ESL server 1 outputs data to the wireless communication base station 3-1 through the communication line 2. Then, the wireless communication base station 3-1 converts the data to radio signal and sends it to the electronic shelf label 4 1-1.

In the electronic shelf label 4 1-1, the signal received by the antenna 22 is converted to data by the sending/receiving circuit 23 and sent to the microprocessor 21. The microprocessor 21 converts the input data to display data and indicates it on the display 24.

The electronic shelf label 4 1-1 responds to the ESL server 1. This response data is sent from the microprocessor 21 to the sending/receiving circuit 23, converted to radio signal by this sending/receiving circuit 23 and further sent to the wireless communication base station 3-1 from the antenna 22 by radio.

The wireless communication base station 3-1 converts the received radio signal to response data and sends to the control portion 11 through the communication line 2. Consequently, the control portion 11 can verify a response to the data sent to the electronic shelf label 4 1-1.

The battery control circuit 25 of each of the electronic shelf labels 4 1-1–4 1-m–4 k-1–4 k-n supervises the capacity of the battery 26, for example, through output voltage. If this output voltage under supervision drops below a predetermined level, it detects the drop of the capacity and sends a detection signal S to the microprocessor 21.

If the microprocessor 21 fetches the detection signal S, it sends a replacement request signal notifying that the capacity of the battery has dropped to the ESL server 1 by radio like the response data.

In the electronic shelf label, a display content of its display 24 may be changed to a display content indicating the replacement when it sends the replacement request signal to the ESL server 1 by radio.

Figure 4:
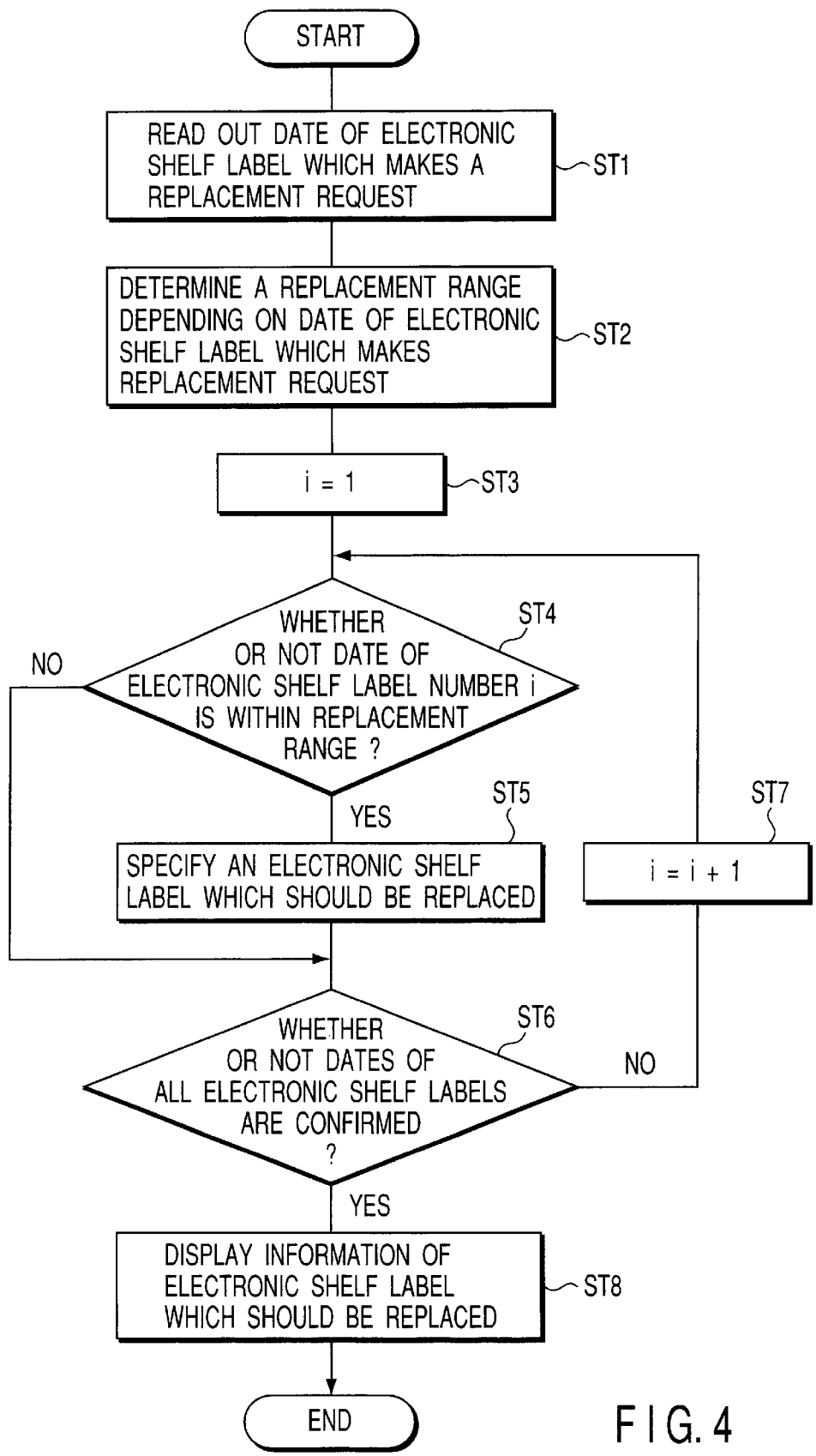
FIG. 4 is a flow chart showing a specific processing of the electronic shelf label by an ESL server according to the first embodiment of the present invention.

If the ESL server 1 receives a replacement request signal from the electronic shelf label, it carries out processing for specifying the electronic shelf label as shown in FIG. 4.

In this processing, if the ESL server 1 receives the replacement request signal from the electronic shelf label, in ST1, it retrieves an electronic shelf label number of an electronic shelf label which makes a replacement request from the database 12 and reads date information of its corresponding production date or installation date.

Subsequently, the ESL server 1 determines an object range based on the read date information in ST2. For example, when the number of the electronic shelf label which makes a replacement request is "2", the date information is "1999.10.2". Thus, before Oct. 2, 1999 is determined as the object range.

Subsequently, the ESL server 1 sets the count value i of the counter to "1"in ST3. In ST4, whether or not the date of the electronic shelf label number i is within the object range, or date before Oct. 2, 1999 is determined.

If the date is within the object range, the ESL server 1 specifies an electronic shelf label corresponding to the electronic shelf label number i as an electronic shelf label which should be replaced in ST5. If the date is out of the object range, the processing of ST5 is not carried out.

Then, the ESL server 1 checks whether or not dates of all the electronic shelf labels are confirmed in ST6. Otherwise, it counts up the count value of the counter by 1 in ST7 and returns to the processing of ST4.

If confirmation of the dates of all the electronic shelf labels is completed, the ESL server 1 notifies of information of the electronic shelf label specified as an electronic shelf label which should be replaced through the display 13.

Meanwhile, the ESL server 1 may notify the above-mentioned matter by printing or by sending it to a handy terminal carried by a worker working near the shelf so as to indicate it on a display of the handy terminal.

If in this system, an electronic shelf label makes a replacement request, the ESL server 1 determines a replacement object range corresponding to an electronic shelf label number i from the database 12 so as to specify an electronic shelf label which should be replaced. For example, if the object range is determined to be date prior to Oct. 2, 1999, an electronic shelf label corresponding to electronic shelf label number 1-5052 is specified.

The ESL server 1 displays electronic shelf label information of the specified electronic shelf label on the display 13.

Consequently, the worker can be notified that the capacity of the battery in the electronic shelf label corresponding to the electronic shelf label number 1-5052 has become short. Therefore, the worker comes to replace the electronic shelf label corresponding to the electronic shelf label number 1-5052 whose battery capacity has become short with an electronic shelf label having a new battery. This replacement is very effective for an electronic shelf label in which power consumption of its battery 26 is affected largely by the number of operating days.

In this way, the electronic shelf label having the battery 26 whose remaining capacity is short is specified easily and securely from standpoint of the operating days and this specified electronic shelf label is notified through the display 13 of the ESL server 1.

The ESL server 1 does not have to carry out a processing for specifying an electronic shelf label which should be replaced until it receives a replacement request from the electronic shelf label, thereby reducing a burden of the ESL server.

Although in the ESL server 1 according to this embodiment, the replacement object range of the electronic shelf label to be replaced is set prior to a date of an electronic shelf label which makes a replacement request, the present invention is not restricted to this example. For example, if the display shelf and electronic shelf label are scheduled to be changed in layout a month after Oct. 2, 1999, it is permissible to set up the replacement object range of the electronic shelf label to be replaced prior to Nov. 2, 1999 which is a month after.

If such a setting is carried out, the electronic shelf label of the replacement object falls on the electronic shelf label corresponding to the electronic shelf label number 1-6548.

Although according to this embodiment, the replacement object range of an electronic shelf label which should be replaced when the battery capacity of an electronic shelf label drops below its predetermined level is set up, the present invention is not restricted to this example, but it is permissible to set up the replacement object range of electronic shelf labels when the battery capacities of plural electronic shelf labels drop below the predetermined value.

For example, if the quantity of the electronic shelf labels which starts setting of the object range is set to five and then the battery capacities of the electronic shelf labels drop below the predetermined level in the order of the electronic shelf label number 2, 3120, 563, 5011, 2568, the ESL server 1 may display electronic shelf label information of an electronic shelf label which should be replaced for beginning four apparatuses each time when the replacement request is made and if such a replacement request occurs in the fifth electronic shelf label 2568, display electronic shelf label information of electronic shelf labels which should be replaced in summary, by carrying out a specific processing for specifying the electronic shelf labels to be replaced as shown in FIG. 4.

Further, the ESL server 1 may set up the quantity of the electronic shelf labels which starts the setting of the object range according to a ratio of electronic shelf labels in which the replacement request occurs with respect to total quantity of electronic shelf labels having the same date.

That is, 5052 units of the electronic shelf labels having a date of Oct. 2, 1999, are set up in the database 12. The ESL server 1 may start a processing for specifying the electronic shelf labels when the replacement requests occur from 11 units corresponding to 0.2% of these 5052 units.

In this case, for beginning ten units, the unit is replaced each time when the replacement request is made. If the replacement request is made from an eleventh unit and the following units, a processing for specifying an electronic shelf label which should be replaced as shown in FIG. 4 is carried out and then, information about an electronic shelf label which should be replaced is displayed in summary.

Although according to this embodiment, the dates of all electronic shelf labels are confirmed so as to specify an electronic shelf label to be replaced and after that, information about the electronic shelf labels is displayed in summary, the present invention is not restricted to this example, but it is permissible to indicate information of the electronic shelf labels each time when an electronic shelf label to be replaced is specified.

Further, although according to this embodiment, the electronic shelf label specified for replacement itself is replaced, the present invention is not restricted to this example, but it is permissible to replace only the battery in the electronic shelf label.

(Second Embodiment)

A structure of the electronic shelf label system of this embodiment is basically the same as that of FIG. 1 and a structure of the electronic shelf label is also the same as that of FIG. 2. A different portion is the structure of database provided in the ESL server 1.

As shown in FIG. 5, a database 121 for use stores initial power capacity of the batteries 26 provided on the respective electronic shelf labels 4 1-1–4 1-$m$–4 $k$-1–4 $k$-$n$ for each electronic shelf label number.

Figure 6:
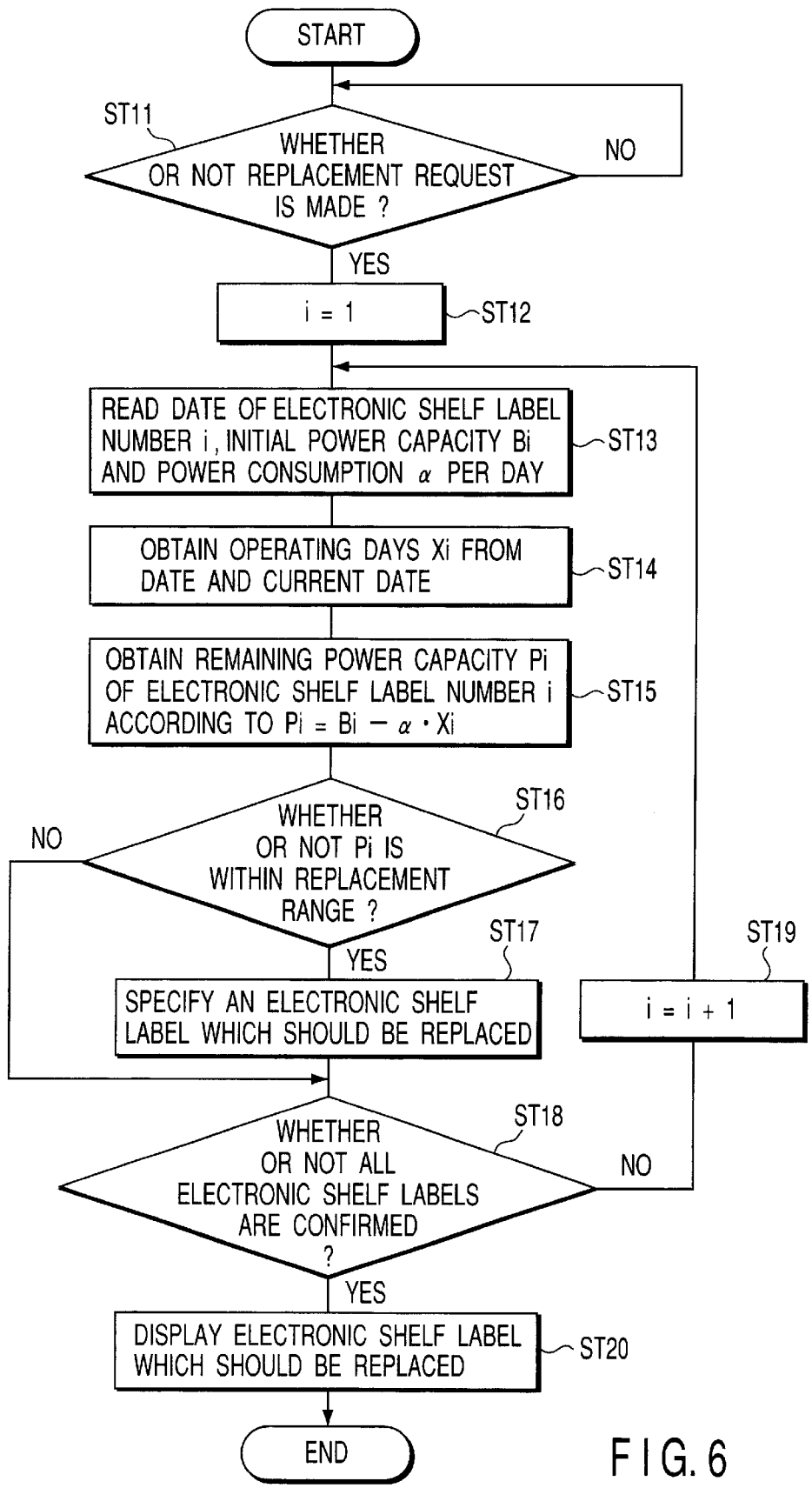
FIG. 6 is a flow chart showing a specific processing of the electronic shelf label by an ESL server according to the second embodiment of the present invention.

The ESL server 1 carries out a processing for specifying an electronic shelf label as shown in FIG. 6.

When receiving a replacement request from an electronic shelf label which detects a drop of the battery capacity in ST11, the ESL server 1 sets up a count value i of a counter to "1".

Subsequently, in ST13, the ESL server 1 reads out a date corresponding to an electronic shelf label number i, initial power capacity B1 of the battery 26 and a preliminarily set power consumption $\alpha$ per day of the electronic shelf label.

Then, in ST14, the ESL server 1 obtains the number of operating days X1 of an electronic shelf label which dispatches a replacement request from date read out from the database 121 and current date.

Next, the ESL server 1 obtains a remaining power capacity P1 of an electronic shelf label corresponding to an electronic shelf label number i by operation based on Pi=Bi–$\alpha$·X1.

In step ST16, the ESL server 1 determines whether or not the remaining power capacity Pi is within a preliminarily set object range or a replacement range.

Then, if the remaining power capacity Pi is within the replacement range, in ST17, the ESC server 1 specifies an electronic shelf label corresponding to the electronic shelf label number i as an electronic shelf label which should be replaced. If the remaining power capacity Pi is out of the replacement range, a processing of ST17 is not carried out.

In ST18, the ESL server 1 verifies whether or not all the electronic shelf labels are checked.

If all the electronic shelf labels are not checked, the ESL server 1 counts up the count value i of the counter by 1 and returns to the processing of ST13.

If all the electronic shelf labels are checked, in ST20, the ESL server 1 indicates electronic shelf labels, which should be replaced, through the electronic shelf label information displayed on the display 13.

Meantime, the ESL server 1 may notify that matter by printing or send the information to a handy terminal carried by a worker near a display shelf by radio so as to indicate that matter on a display of the handy terminal.

If a replacement request is made from an electronic shelf label in this system, the ESL server 1 calculates the remaining power capacities Pi of all the electronic shelf labels according to dates and initial power capacity of the battery 26, stored in the database 121 and preliminarily set power consumption a per day of the electronic shelf label. Then, the ESL server 1 specifies an electronic shelf label in which a calculated remaining power capacity Pi thereof is within the preliminarily set replacement range and displays the information of this specified electronic shelf label on the display 13.

Consequently, the worker replaces a corresponding electronic shelf label with a new electronic shelf label according to information of the electronic shelf label displayed on the display 13. Alternatively, he replaces the battery of the corresponding electronic shelf label with a new battery.

This replacement is very effective in case of using an electronic shelf label in which power consumption of the battery 26 is affected largely depending on the number of operating days and the initial power capacity of the battery 26 differs from one electronic shelf label to another.

In this way, an electronic shelf label in which the remaining power capacity of the battery 26 is short is specified easily and securely from a relation between the initial power capacity and number of operating days. This specified electronic shelf label is notified through the display 13 of the ESL server 1.

The ESL server 1 does not have to carry out a processing for specifying an electronic shelf label which should be replaced until it receives a replacement request from the electronic shelf label, thereby reducing a burden thereof.

Although according to this embodiment, the ESL server 1 displays information of the electronic shelf label which should be replaced, after specifying the electronic shelf label which should be replaced by confirming the remaining power capacities Pi of all the electronic shelf labels, the present invention is not restricted to this example, but it is permissible to display the information of the electronic shelf label each time when an electronic shelf label which should be replaced is specified.

Although this embodiment is described above on an assumption that power consumption α per day in the respective electronic shelf labels 4 1-1-4 1-m-4 k-1-4 k-n is already known, a case in which the power consumption α is not known is permitted. That is, the electronic shelf label generates the replacement request when the voltage of the battery 26 drops below a predetermined level. Therefore, the remaining power capacity Pi of the battery 26 when the replacement request is generated from the electronic shelf label is a well-known value. The ESL server 1 can store this electric energy Pi.

If the replacement request is generated from the electronic shelf label, the ESL server 1 reads out a date and initial power capacity Bi corresponding to the electronic shelf label number i of this electronic shelf label from the database 121 so as to obtain the number of operating days Xi. Thus, the power consumption αper day can be obtained from α=(Bi−Pi)/Xi.

Because the power consumption α per day obtained in this way is basically equal in the same electronic shelf label, this can be used for calculation of the remaining power capacity Pi of all the electronic shelf labels.

Therefore, if the power consumption α per day is not known, it is possible to specify electronic shelf labels in a replacement range by calculating the remaining power Pi of all the electronic shelf labels.

Meanwhile, although according to this embodiment, the remaining power capacity Pi is calculated from a relation between the number of operating days Xi and initial electric energy Bi using the power consumption α of a day, the present invention is not restricted to this example. It is permissible to calculate the remaining power capacity Pi by using power consumption of other unit period than a day such as power consumption per week and power consumption per hour.

(Third Embodiment)

A structure of the electronic shelf label system of this embodiment is basically the same as that of FIG. 1 and a structure of the electronic shelf label is also the same as that of FIG. 2.

A different portion is the structure of database provided in the ESL server 1, and a correspondence relationship between each of electronic shelf labels 4 1-1-4 k-n divided into groups and each of wireless communication base 3-1-3-k is added.

As shown in FIG. 7, the database 122 for use here stores wireless communication base station number, wireless communication base station transmission frequency, and information A-E for each electronic shelf label number. Since the wireless communication base station number corresponds to wireless communication base stations 3-1-3-k, the base station numbers corresponding to electronic shelf label numbers of the electronic shelf labels in the same group have the same number.

The wireless communication base stations 3-1-3-k count frequency of transmission to respective electronic shelf labels and notifies the ESL server 1 of counted transmission frequency periodically or when the replacement request is made from the electronic shelf label.

If the electronic shelf labels 4 1-1-4 1-m-4 k-1-4 k-n receives radio signal from the wireless communication base stations 3-1-3-k, it carries out receiving processing to determine whether or not that radio signal is data for itself.

In this system, a wireless communication base station sometimes communicates with several hundreds electronic shelf labels by radio. In this case, if a radio signal is transmitted from the wireless communication base station, the several hundreds electronic shelf labels start receiving processing all at once. Then, an electronic shelf label which receives data for itself continues the processing in order to fetch in data, and however, other electronic shelf labels avoid the following processing.

Therefore, even if power consumption in a single receiving processing in the electronic shelf label is slight, the frequency of processings for receiving radio signal from a wireless communication base station is the same as the frequency of transmission of the wireless communication base station and becomes tremendous. Therefore, power consumed by electronic shelf label's receiving processing is increased.

When a medium having a sharp directivity and a small diffraction like infrared ray transmission is used, the transmission frequency of the wireless communication base station corresponds to the reception frequency of the electronic shelf label one to one. In such a case, the transmission frequency of the wireless communication base station becomes equal to the reception frequency of the electronic shelf label.

As for power consumption of the electronic shelf label, power consumption by receiving processing of radio signal from the wireless base station may be sometimes larger than power consumption in the display.

Figure 8:
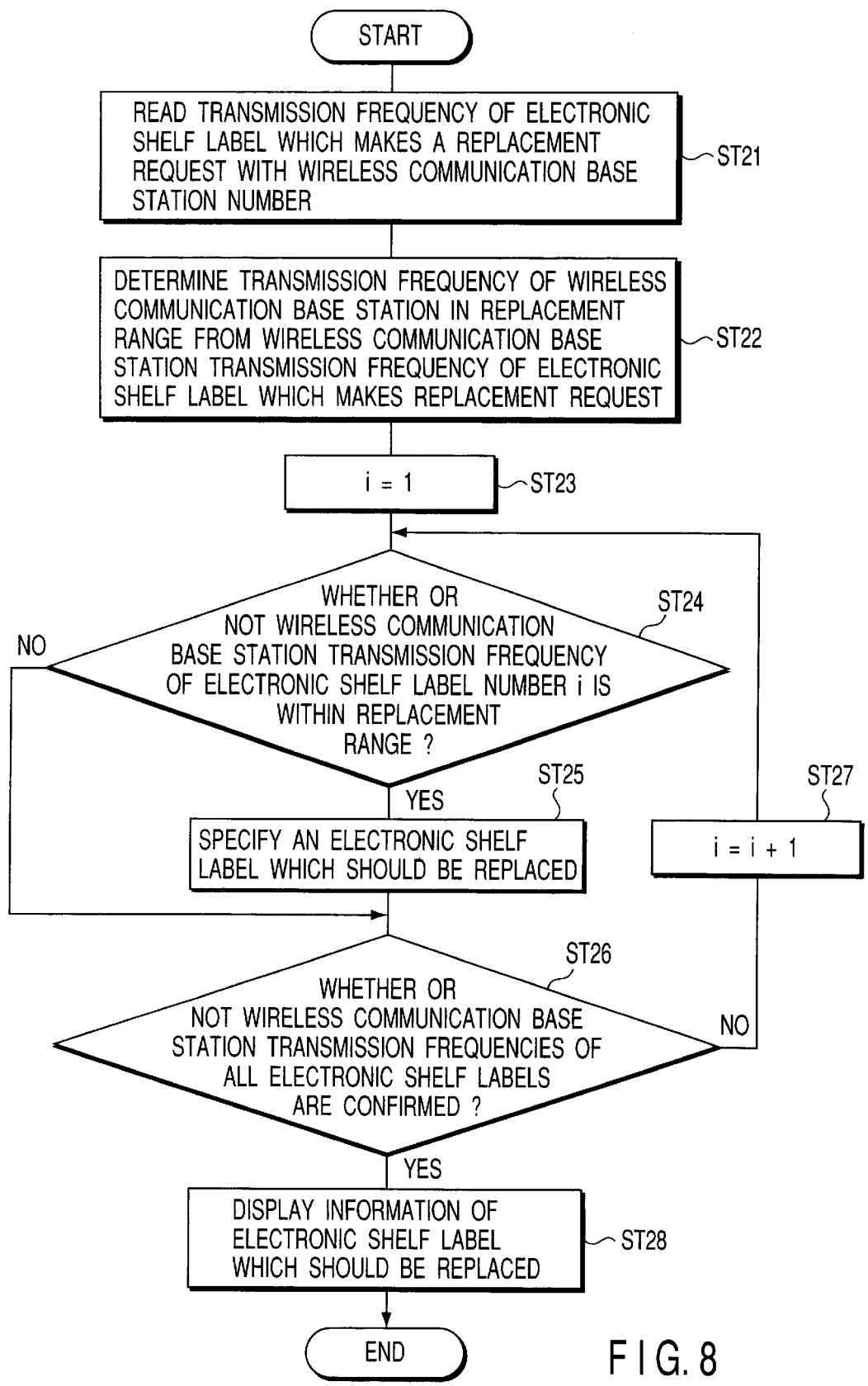
FIG. 8 is a flow chart showing a specific processing of the electronic shelf label by an ESL server according to the third embodiment of the present invention.

In this case, the aforementioned ESL server 1 carries out a processing for specifying the electronic shelf label as shown in FIG. 8.

If a replacement request is made from the electronic shelf label, in ST21, the ESL server 1 reads out a wireless communication base station number and a wireless communication base station transmission frequency corresponding to an electronic shelf label number corresponding to an electronic shelf label which is requested to be replaced from the database 122.

In ST22, the ESL server 1 determines a wireless communication base station transmission frequency of a replacement object range from read wireless communication base station transmission frequency. For example, if the replacement request is generated from an electronic shelf label having an electronic shelf label number "12", the ESL server 1 determines the replacement object range to be 5,058,921 or more because the wireless communication base station transmission frequency read out from the database 122 is 5,058,921 which corresponds to the electronic shelf label number "2".

In ST23, the ESL server 1 sets the count value i of the counter to "1".

In ST24, the ESL server 1 determines whether or not the wireless communication base station transmission frequency corresponding to the electronic shelf label number i is out of the replacement object range or the transmission frequency is 5,058,921 or more. If the transmission frequency is within the object range or 5,058,921 or more, in ST25, the ESL server 1 specifies an electronic shelf label corresponding to the electronic shelf label number i as an electronic shelf label which should be replaced. If the transmission frequency is out of the object range, the processing of ST25 is not carried out.

In ST26, the ESL server 1 checks whether or not all the electronic shelf labels confirm the wireless communication base station transmission frequency.

Unless all the electronic shelf labels are not confirmed, in ST27, the ESL server 1 counts up the count value of the counter by 1 and returns to the processing of ST24.

If whether or not all the electronic shelf labels confirm the radio communication base station transmission frequency is verified, in ST28, the ESL server 1 notifies of electronic shelf label information specified as an electronic shelf label which should be replaced by indicating on the display 13.

Meanwhile, the ESL server 1 may notify the electronic shelf label information by printing or by transmitting it to a handy terminal carried by a worker working near a display shelf so as to indicate on the display of that handy terminal.

If a replacement request is made from an electronic shelf label in this system, the ESL server 1 determines a replacement object range from the wireless communication base station transmission frequency corresponding to a given electronic shelf label number i from the database 122. For example, if the replacement request is made from an electronic shelf label having an electronic shelf label number of "2", the ESL server 1 determines the object range to be 5,058,921 or more. Then, in the database 122, an electronic shelf label corresponding to an electronic shelf label number 1-5054 is specified as an electronic shelf label and then, electronic shelf label information of this specified electronic shelf label is displayed on the display 13.

Consequently, the worker can know that the battery capacity of an electronic shelf label corresponding to electronic shelf label number 1-5054 has become short and replaces it with a new electronic shelf label. Alternatively, the battery 26 of the corresponding electronic shelf label is replaced with a new battery.

This replacement is very effective in case of using an electronic shelf label in which power consumption of the battery 26 is more largely affected by a processing for receiving radio signal from a wireless communication base station than the display 24.

In this way, an electronic shelf label in which the remaining capacity of the battery 26 thereof is short is specified easily based on transmission frequency. This specified electronic shelf label is notified through the display 13 of the ESL server 1.

The ESL server 1 does not have to carry out a processing for specifying an electronic shelf label which should be replaced until it receives a replacement request from the electronic shelf label, so that a burden on the ESL server 1 is reduced.

Although according to this embodiment, each wireless communication base station counts a transmission frequency to the electronic shelf label and sends it to the ESL server, the present invention is not restricted to this example, and instead, the ESL server may monitor transmission of each wireless communication base station and counts transmission frequency each time when transmission occurs.

Although according to this embodiment, the ESL server carries out processing for specifying an electronic shelf label which should be replaced by reading the transmission frequency in order from the electronic shelf label number 1 to determine whether or not it is within the object range, the present invention is not restricted to this example. Instead, each wireless communication base station may carry out processing for specifying the electronic shelf label which should be replaced. For example, the wireless communication base station 3-1 carries out processing for specifying an electronic shelf label which it will communicate and after this, the wireless communication base station 3-k carries out processing for specifying an electronic shelf label which it will communicate.

Meanwhile, although in the ESL server 1, its object range is set more than the reception frequency of the electronic shelf label which makes a replacement request, the present invention is not restricted to this example, and instead, the object range may be set to integer times 10 which is less than the reception frequency of the electronic shelf label which makes the replacement request and nearest the frequency of reception.

Although according to this embodiment, the object range which the ESL server 1 sets is determined with reference to the reception frequency of the electronic shelf label which makes the replacement request, the present invention is not restricted to this example.

Further, although, in the ESL server according to this embodiment, the object range is set up by the frequency of transmission when an electronic shelf label dispatches a replacement request because the battery capacity thereof drops below a predetermined level, the present invention is not restricted to this example, but instead, setting of the object range may be started depending on the frequency of transmission when the replacement request is made because the battery capacity of plural electronic shelf labels drops below a predetermined level.

Although the ESL server of this embodiment indicates information of an electronic shelf label to be replaced by confirming all the electronic shelf labels about the frequency of transmission, the present invention is not restricted to this example, but instead the information of the electronic shelf label may be indicated each time when an electronic shelf label is specified.

(Fourth Embodiment)

The structure of the electronic shelf label system of this embodiment is basically the same as that of FIG. 1 and the structure of the electronic shelf label is also the same as that of FIG. 2. A different portion is the structure of the database provided on the ESL server 1.

As shown in FIG. 9, database 123 stores an initial power capacity of the batteries 26 provided on the respective electronic shelf labels 4 1-1–4 1-$m$–4 $k$-1–4 $k$-$n$ in addition to the function of the database 122 of the third embodiment.

The ESL server 1 sets the count value i of the counter to "1" when it receives a replacement request from the electronic shelf label. Further, it reads wireless communication base station transmission frequency $U_i$ and initial power capacity $B_i$ corresponding to each electronic shelf label i from the database 123 and calculates power consumption β in a preliminarily set single receiving processing of the electronic shelf label, according to $P_i = B_i - \beta \cdot U_i$.

The ESL server 1 determines whether or not the remaining power capacity $P_i$ is within a preliminarily set replacement range and if the remaining power capacity $P_i$ is within the replacement range, an electronic shelf label corresponding to an electric shelf label number i is specified as an electronic shelf label which should be replaced.

In this way, the ESL server 1 calculates the remaining power capacity $P_i$ and determines whether or not it is within the replacement range about all the electronic shelf labels and indicates information of an electronic shelf label specified as an electronic shelf label which should be replaced finally on the display 13.

Consequently, the worker replaces a corresponding electronic shelf label with a new one according to electronic shelf label information indicated on the display 13. Alternatively, he replaces the battery of the corresponding electronic shelf label with a new battery.

This replacement is effective in case where power consumption of the battery 26 is more largely affected by a processing for receiving radio signal from a wireless communication base station than the display 24, an electronic shelf label for receiving a radio signal from adjacent wireless communication base station is used and the initial power capacity of the battery 26 is different depending on individual batteries.

In this way, an electronic shelf label in which the remaining capacity of the battery 26 thereof is short is specified easily based on transmission frequency and the remaining power capacity. This specified electronic shelf label is notified through the display 13 of the ESL server 1.

The ESL server 1 does not have to carry out a processing for specifying an electronic shelf label which should be replaced until it receives a replacement request from the electronic shelf label, so that a burden on the ESL server 1 is reduced.

Although this embodiment is described above on an assumption that power consumption β per day in the respective electronic shelf labels 4 1-1–4 1-$m$–4 $k$-1–4 $k$-$n$ is already known, a case in which the power consumption β is not known is permitted. That is, the electronic shelf label generates the replacement request when the voltage of the battery 26 drops below a predetermined level. Therefore, the remaining power capacity $P_i$ of the battery 26 when the replacement request is generated from the electronic shelf label is a well-known value. Therefore, the ESL server 1 can store this power capacity $P_i$.

If the replacement request is generated from the electronic shelf label, the ESL server 1 reads out a the wireless communication base station transmission frequency Ui and initial power capacity $B_i$ correspond-ing to an electronic shelf label number 1 of this electronic shelf label from the database 123 and obtains preliminarily stored remaining power capacity $P_i$. Thus, the power consumption β by a single reception processing of the electronic shelf label corresponding to an electronic shelf label number i is obtained from $β=(B_i-P_i)/U_i$.

Because the power consumption β by a single reception processing obtained in this way is basically equal in the same electronic shelf label, this can be used for calculation of the remaining electric energy $P_i$ of all the electronic shelf labels.

Therefore, if the power consumption β by a single reception processing is not known, it is possible to specify electronic shelf labels in a replacement range by calculating the remaining power $P_i$ of all the electronic shelf labels.

Although according to this embodiment, the remaining power capacity $P_i$ is calculated from a relation between the wireless communication base station transmission frequency $U_i$ and initial power capacity $B_i$ by using the power consumption β by a single reception processing, the present invention is not restricted to this example, but the remaining power capacity $P_i$ can be calculated from $P_i=B_i-β'·U_i/n$ with reference to the power consumption β' by n reception processing (n≧2).

(Fifth Embodiment)

A structure of the electronic shelf label system of this embodiment is basically the same as that of FIG. 1 and a structure of the electronic shelf label is also the same as that of FIG. 2. A different portion is the structure of database provided in the ESL server 1.

As shown in FIG. 10, a database 124 for use here stores electronic shelf label reception frequency and information A-E of each electronic shelf label.

In this system, the electronic shelf labels 4 1-1–4 1-$m$–4 $k$-1–4 $k$-$n$ consumes larger amount of power for the processing for receiving radio signal from the wireless communication base station than the display 24. Further, the electronic shelf label is capable of communicating with not only a corresponding wireless communication base station but also an adjacent wireless communication base station.

Therefore, the electronic shelf labels 4 1-1–4 1-$m$–4 $k$-1–4 $k$-$n$ cannot calculate power consumption properly according to the transmission frequency of a corresponding wireless communication base station.

Thus, the respective electronic shelf labels 4 1-1–4 1-$m$–4 $k$-1–4 $k$-$n$ counts a reception frequency from the wireless communication base station and when this count value is inquired from the ESL server 1, it is sent to the ESL server 1 through a corresponding wireless communication base station.

Figure 11:
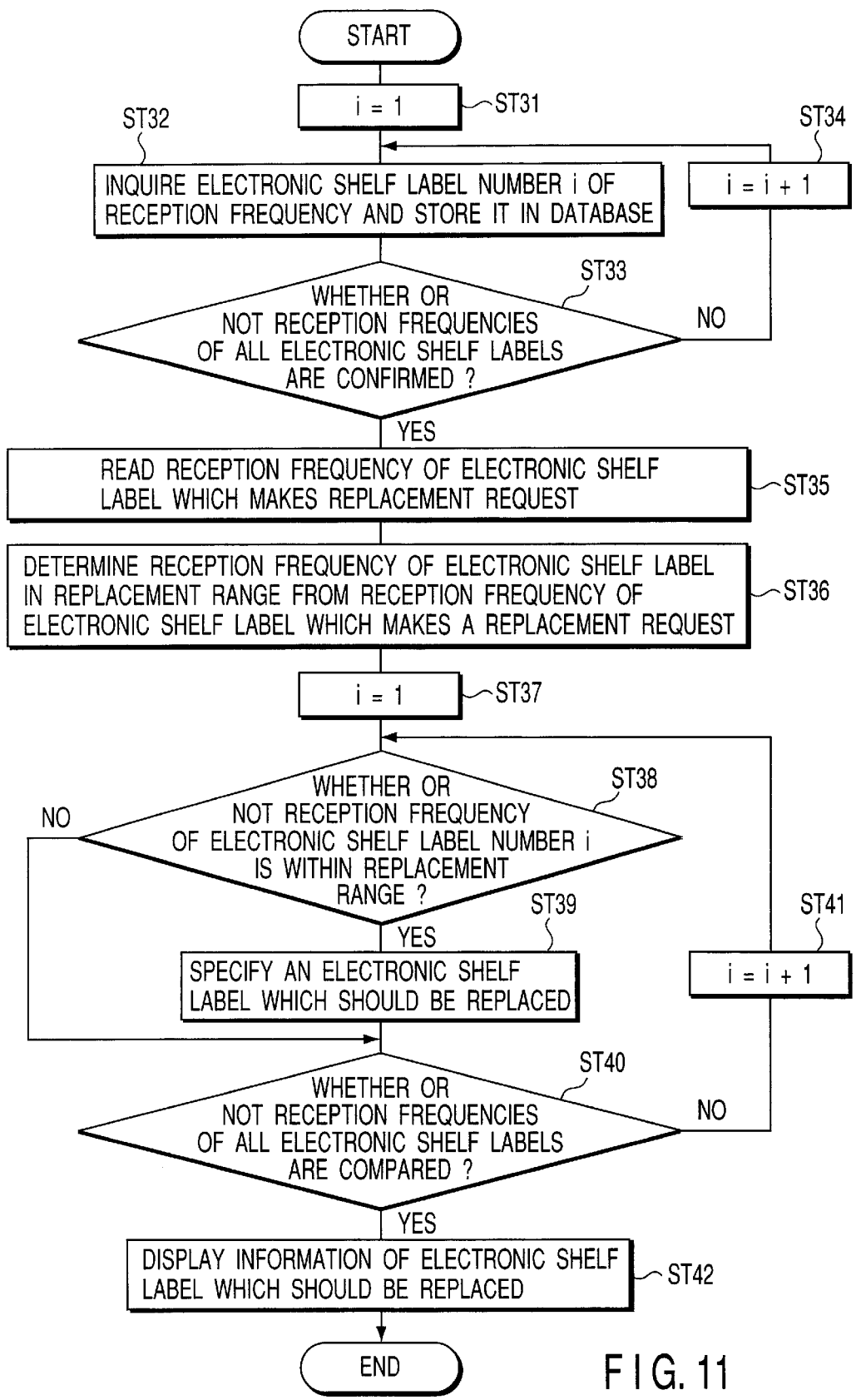
FIG. 11 is a flow chart showing a specific processing of the electronic shelf label by an ESL server according to the fifth embodiment of the present invention.

The aforementioned ESL 1 carries out a processing for specifying the electronic shelf label shown in FIG. 11.

If a replacement request is generated from an electronic shelf label, the ESL server 1 sets the count value i of the counter to "1" in ST31. Then, in ST32, it inquires an electronic shelf label corresponding to the electronic shelf label number i for reception frequency. If the ESL server 1 receives the reception frequency, it stores the reception frequency in electronic shelf label reception frequency area corresponding to the electronic shelf label number i of the database 124.

Subsequently, the ESL server 1 checks whether or not the reception frequencies of all the electronic shelf labels are confirmed in ST33 and otherwise, increments the count value i of the counter by 1 in ST34 and then returns to processing of ST32.

If confirmation about the reception frequencies of all the electronic shelf labels is terminated, the ESL server 1 reads out a reception frequency of the electronic shelf label which dispatches a replacement request from the database 124 in ST35. Then, in ST36, an object range of the reception frequency of an electronic shelf label which should be replaced is determined from this reception frequency.

For example, assuming that the replacement request is generated from an electronic shelf label having an electronic shelf label number "3", a corresponding reception frequency is 5,025,167 times. In this case, the ESL server 1 determines the replacement object range to be 5,025,167 times in terms of the reception frequency.

Subsequently, the ESL server 1 sets the count value i of the counter to "1" in ST37. In ST38, whether or not the reception frequency of the electronic shelf label corresponding to an electronic shelf label number i is within the object range or whether or not the reception frequency is 5,025,167 or more is determined.

If the reception frequency is within the object range, that is, 5,025,167 or more, the ESL server 1 specifies the electronic shelf label corresponding to the electronic shelf label number i as an electronic shelf label which should be replaced in ST39. If the reception frequency is out of the object range, the processing of ST39 is not carried out.

Subsequently, the ESL server 1 checks whether or not the reception frequencies of all the electronic shelf labels are compared in ST40.

If the reception frequencies of all the electronic shelf labels are not compared, in ST41, the ESL server 1 increments the count value of the counter by 1 and returns to the processing of ST38. If the comparison of the reception frequencies of all the electronic shelf labels is completed, the ESL server 1 displays information of the electronic shelf labels specified as an electronic shelf label which should be replaced on the display 13 in ST42.

Meanwhile the ESL server 1 may notify the information by printing or display it on the display of the handy terminal by sending to the handy terminal carried by a worker working near a display shelf.

In this system, the respective electronic shelf labels 4 1-1–4 1-$m$–4 $k$-1–4 $k$-$n$ counts a reception frequency of radio communication with the wireless communication base station. Then, if the voltage of the battery 26 drops below a predetermined level, the electronic shelf label sends a replacement request to the ESL server 1 through the wireless communication base station.

If the ESL server 1 receives the replacement request from the electronic shelf label, first it inquires all the electronic shelf labels 4 1-1–4 1-$m$–4 $k$-1–4 $k$-$n$ about the reception frequency, obtains each reception frequency from each electronic shelf label and stores it in the database 124.

The ESL 1 reads a reception frequency corresponding to the electronic shelf label of the electronic shelf label which dispatches the replacement request and determines a replacement object range. For example, a reception frequency above this reception frequency is set to the object range.

The ESL server 1 reads the reception frequency of each of all the electronic shelf labels 4 1-1–4 1-$m$–4 $k$-1–4 $k$-$n$ successively from the database 124 and compares those with the object range. If any reception frequency is within the object range, it specifies that electronic shelf label as an electronic shelf label which should be replaced.

Therefore, the ESL server 1 decides the object range to be 5,025,167 times or more, it specifies electronic shelf labels corresponding to electronic shelf label numbers 1, 2, 3, 5052, 5053, 5054, 6549 and the like. Then, information of the specified electronic shelf label is displayed on the display 13.

Consequently, the worker can know that the battery capacity of the electronic shelf label corresponding to the specified electron shelf label number has dropped and replaces it with a new electronic shelf label. Alternatively, he replaces the battery 26 of the corresponding electronic shelf label with a new one.

This replacement is very effective in case of using an electronic shelf label in which power consumption of the battery 26 is more largely affected by a processing for receiving radio signal from a radio communication base station than the display 24 and which receives radio signal from an adjacent wireless communication base station.

In this way, an electronic shelf label in which the remaining power capacity of the battery 26 thereof is short is specified easily based on reception frequency. This specified electronic shelf label is notified through the display 13 of the ESL server 1.

The ESL server 1 does not have to carry out a processing for specifying an electronic shelf label which should be replaced until it receives a replacement request from the electronic shelf label, so that a burden on the ESL server 1 is reduced.

Meanwhile, although in the ESL server 1 of this embodiment, its object range is set more than the reception frequency of the electronic shelf label which makes a replacement request, the present invention is not restricted to this example, and instead, the object range may be set to integer times 10 which is less than the reception frequency of the electronic shelf label which makes the replacement request and nearest the frequency of reception. That is, the object range set by the ESL server 1 is not restricted to the reception frequency of the electronic shelf label which makes the replacement request.

Further, although, in the ESL server according to this embodiment, the object range is set up when an electronic shelf label dispatches a replacement request because the battery capacity thereof drops below a predetermined level, the present invention is not restricted to this example, but instead, setting of the object range may be started when the replacement request is made because the battery capacities of plural electronic shelf labels drop below a predetermined level.

(Sixth Embodiment)

The structure of the electronic shelf label system of this embodiment is basically the same as that of FIG. 1 and the structure of the electronic shelf label is also the same as that of FIG. 2. A different portion is the structure of the database provided on the ESL server 1.

As shown in FIG. 12, database 125 stores an initial power capacity of the batteries 26 provided on the respective electronic shelf labels 4 1-1–4 1-$m$–4 $k$-1–4 $k$-$n$ in addition to the function of the database 124 of the fifth embodiment.

The ESL server 1 receives the replacement request from the electronic shelf label. Then, it receives the reception frequencies from all the electronic shelf labels 4 1-1–4 1-$m$–4 $k$-1–4 $k$-$n$, stores them in the database 125 and sets the count value i of the counter to "1". Further, it reads electronic shelf label reception frequency $Y_i$ corresponding to each electronic shelf label i and initial power capacity $B_i$ of the battery 26 from the database 125, reads a preliminarily set power consumption $\beta$ in a single reception processing of the electronic shelf label and obtains the remaining power capacity $P_i$ of the electronic shelf label corresponding to the electronic shelf label number according to $P_i = B_i - \beta \cdot Y_i$.

The ESL server 1 determines whether or not the remaining power capacity $P_i$ is within a preliminarily set replacement range and if the remaining power capacity $P_i$ is within the replacement range, an electronic shelf label corresponding to an electric shelf label number i is specified as an electronic shelf label which should be replaced.

In this way, the ESL server 1 calculates the remaining power capacity $P_i$ and determines whether or not it is within the replacement range about all the electronic shelf labels and indicates information of an electronic shelf label specified as an electronic shelf label which should be replaced finally on the display 13.

Consequently, the worker replaces a corresponding electronic shelf label with a new one according to electronic shelf label information indicated on the display 13. Alternatively, he replaces the battery of the corresponding electronic shelf label with a new battery.

This replacement is effective in case where power consumption of the battery 26 is more largely affected by a processing for receiving radio signal from a wireless communication base station than the display 24, an electronic shelf label for receiving a radio signal from adjacent wireless communication base station is used and the initial power capacity of the battery 26 is different depending on individual batteries.

In this way, an electronic shelf label in which the remaining capacity of the battery 26 thereof is short is specified easily based on reception frequency and the initial power capacity thereof. This specified electronic shelf label is notified through the display 13 of the ESL server 1.

The ESL server 1 does not have to carry out a processing for specifying an electronic shelf label which should be replaced until it receives a replacement request from the electronic shelf label, so that a burden on the ESL server 1 is reduced.

Although this embodiment is described above on an assumption that power consumption β by single reception processing in the respective electronic shelf labels 4 1-1–4 1-m–4 k-1–4 k-n is already known, a case in which the power consumption β is not known is permitted. That is, the electronic shelf label generates the replacement request when the voltage of the battery 26 drops below a predetermined level. Therefore, the remaining power capacity $P_i$ of the battery 26 when the replacement request is generated from the electronic shelf label is a well-known value. Therefore, the ESL server 1 can store this power capacity $P_i$.

If the replacement request is generated from the electronic shelf label, the ESL server 1 obtains power consumption β by a single reception processing of the electronic shelf label corresponding to an electronic shelf label number i according to the reception frequency $Y_i$ received from each electronic shelf label, initial power capacity $B_i$ and preliminarily stored remaining power capacity $P_i$ according to $\beta=(B_i-P_i)/Y_i$.

Because the power consumption β by a single reception processing obtained in this way is basically equal in the same electronic shelf label, this can be used for calculation of the remaining power capacity $P_i$ of all the electronic shelf labels.

Therefore, if the power consumption β by a single reception processing is not known, it is possible to specify electronic shelf labels which should be replaced by calculating the remaining power capacity $P_i$ of all the electronic shelf labels.

Although according to this embodiment, the remaining power capacity $P_i$ is calculated from a relation between the electronic shelf label reception frequency $Y_i$ and initial power capacity $B_i$ by using the power consumption β by a single reception processing, the present invention is not restricted to this example, but the remaining power capacity $P_i$ can be calculated from $P_i=B_i-\beta' \cdot Y_i/n$ with reference to the power consumption $\beta'$ by n reception processing ($n \geq 2$).

(Seventh Embodiment)

A structure of the electronic shelf label system of this embodiment is basically the same as that of FIG. 1 and a structure of the electronic shelf label is also the same as that of FIG. 2. A different portion is the structure of database provided in the ESL server 1.

As shown in FIG. 13, a database 126 for use here stores electronic shelf label transmission frequency and information A-E of each electronic shelf label.

In this system, the electronic shelf labels 4 1-1–4 1-m–4 k-1–4 k-n consumes larger amount of power for the processing for transmitting radio signal to the wireless communication base station than the display 24.

Thus, the respective electronic shelf labels 4 1-1–4 1-m–4 k-1–4 k-n counts a transmission frequency to the wireless communication base station and when this count value is inquired from the ESL server 1, it is sent to the ESL server 1 through a corresponding wireless communication base station.

Figure 14:
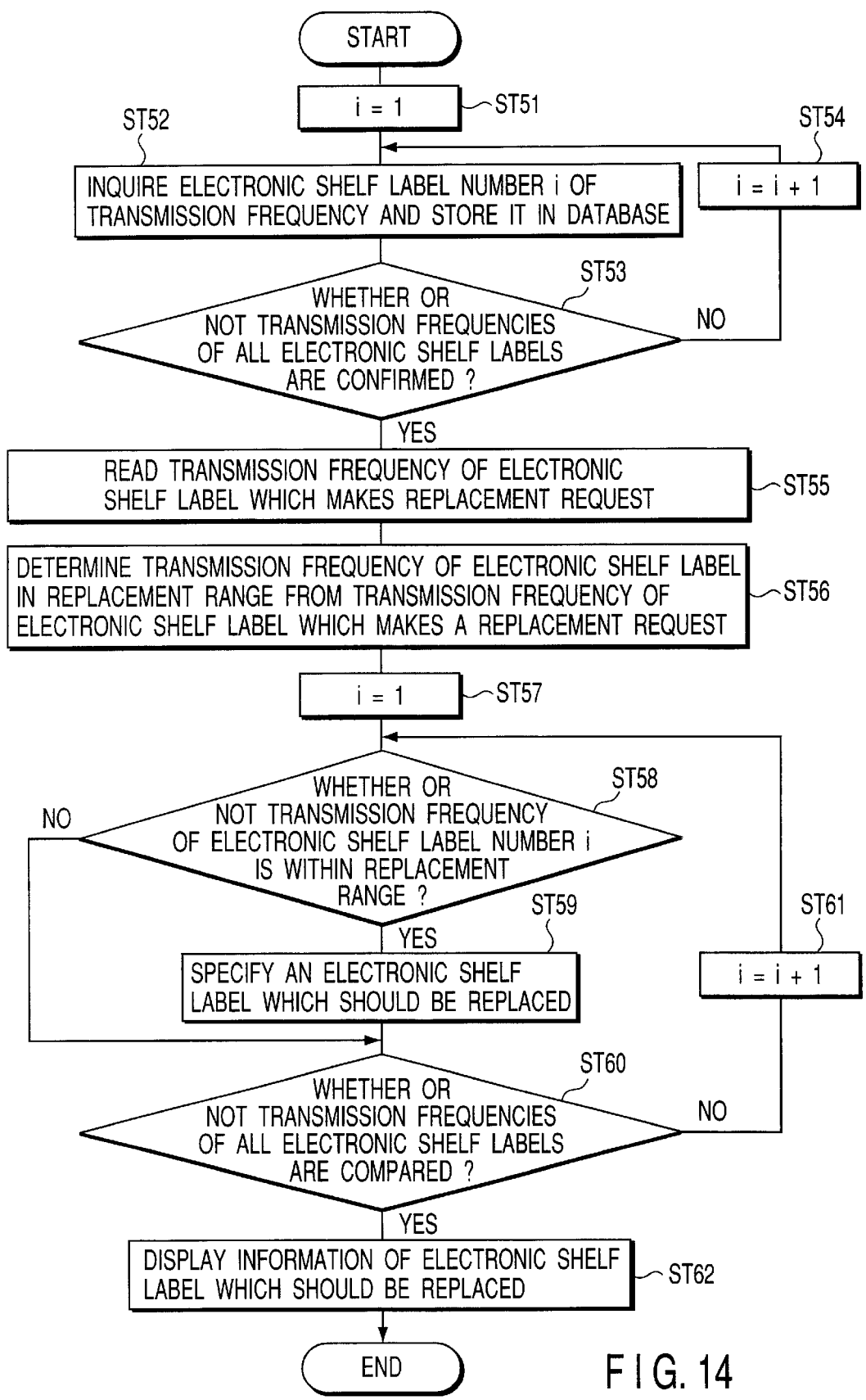
FIG. 14 is a flow chart showing a specific processing of the electronic shelf label by an ESL server according to the seventh embodiment of the present invention.

The aforementioned ESL 1 carries out a processing for specifying the electronic shelf label shown in FIG. 14.

If a replacement request is generated from an electronic shelf label, the ESL server 1 sets the count value i of the counter to "1" in ST51. Then, in ST52, it inquires an electronic shelf label corresponding to the electronic shelf label number i for transmission frequency. If the ESL server 1 receives the transmission frequency, it receives the transmission frequency and stores it in electronic shelf label reception frequency area corresponding to the electronic shelf label number i of the database 126.

Subsequently, the ESL server 1 checks whether or not the reception frequencies of all the electronic shelf labels are confirmed in ST53 and otherwise, increments the count value i of the counter by 1 in ST54 and then returns to processing of ST52.

If confirmation about the reception frequencies of all the electronic shelf labels is terminated, the ESL server 1 reads out a transmission frequency of the electronic shelf label which dispatches a replacement request from the database 126 in ST55. Then, in ST56, an object range of the transmission frequency of an electronic shelf label which should be replaced is determined from this transmission frequency.

For example, assuming that the replacement request is generated from an electronic shelf label having an electronic shelf label number "5056", a corresponding transmission frequency is 5,526 times. In this case, the ESL server 1 determines the replacement object range to be 5,526 times in terms of the transmission frequency.

Subsequently, the ESL 1 sets the count value i of the counter to "1" in ST57. In ST58, whether or not the transmission frequency of the electronic shelf label corresponding to an electronic shelf label number i is within the object range or whether or not the reception frequency is 5,526 or more is determined.

If the transmission frequency is within the object range, that is, 5,025,167 or more, the ESL server 1 specifies the electronic shelf label corresponding to the electronic shelf label number i as an electronic shelf label which should be replaced in ST59. If the transmission frequency is out of the object range, the processing of ST59 is not carried out.

Subsequently, the ESL server 1 checks whether or not the transmission frequencies of all the electronic shelf labels are compared in ST60.

If the transmission frequencies of all the electronic shelf labels are not compared, in ST61, the ESL server 1 increments the count value of the counter by 1 and returns to the processing of ST58. If the comparison of the transmission frequencies of all the electronic shelf labels is completed, the ESL server 1 displays information of the electronic shelf labels specified as an electronic shelf label which should be replaced on the display 13 in ST62.

Meanwhile the ESL server 1 may notify the information by printing or display it on the display of the handy terminal by sending to the handy terminal carried by a worker working near a display shelf.

In this system, the respective electronic shelf labels 4 1-1–4 1-m–4 k-1–4 k-n counts a transmission frequency of radio communication with the wireless communication base station. Then, if the voltage of the battery 26 drops below a predetermined level, the electronic shelf label sends a replacement request to the ESL server 1 through the wireless communication base station.

If the ESL server 1 receives the replacement request from the electronic shelf label, first it inquires all the electronic shelf labels 4 1-1–4 1-m–4 k-1–4 k-n about the transmission frequency, obtains each transmission frequency from each electronic shelf label and stores it in the database 126.

The ESL server 1 reads a transmission frequency corresponding to the electronic shelf label number of the electronic shelf label which dispatches the replacement request and determines a replacement object range. For example, a transmission frequency above this transmission frequency is set to the object range.

The ESL server 1 reads the transmission frequency of each of all the electronic shelf labels 4 1-1–4 1-m–4 k-1–4 k-n successively from the database 126 and compares those with the object range. If any transmission frequency is within the object range, it specifies that electronic shelf label as an electronic shelf label which should be replaced.

Therefore, the ESL 1 decides the object range to be 5,526 times or more, it specifies electronic shelf labels corresponding to electronic shelf label numbers 3, 5053, 5056 and the like. Then, information of the specified electronic shelf label is displayed on the display 13.

Consequently, the worker can know that the battery capacity of the electronic shelf label corresponding to the specified electron shelf label number has dropped and replaces it with a new electronic shelf label. Alternatively, he replaces the battery 26 of the corresponding electronic shelf label with a new one.

This replacement is very effective in case of using an electronic shelf label in which power consumption of the battery 26 is more largely affected by a processing for receiving radio signal from a wireless communication base station than the display 24.

In this way, an electronic shelf label in which the remaining capacity of the battery 26 thereof is short is specified easily based on transmission frequency. This specified electronic shelf label is notified through the display 13 of the ESL server 1.

The ESL server 1 does not have to carry out a processing for specifying an electronic shelf label which should be replaced until it receives a replacement request from the electronic shelf label, so that a burden on the ESL server 1 is reduced.

Meanwhile, although in the ESL server 1 of this embodiment, its object range is set more than the transmission frequency of the electronic shelf label which makes a replacement request, the present invention is not restricted to this example, and instead, the object range may be set to integer times 10 which is less than the transmission frequency of the electronic shelf label which makes the replacement request and nearest the frequency of reception. That is, the object range set by the ESL server 1 is not restricted to the transmission frequency of the electronic shelf label which makes the replacement request.

Further, although, in the ESL server according to this embodiment, the object range is set up when an electronic shelf label dispatches a replacement request because the battery capacity thereof drops below a predetermined level, the present invention is not restricted to this example, but instead, setting of the object range may be started when the replacement request is made because the battery capacities of plural electronic shelf labels drop below a predetermined level.

(Eighth Embodiment)

The structure of the electronic shelf label system of this embodiment is basically the same as that of FIG. 1 and the structure of the electronic shelf label is also the same as that of FIG. 2. A different portion is the structure of the database provided on the ESL server 1.

As shown in FIG. 15, database 127 stores an initial power capacity of the batteries 26 provided on the respective electronic shelf labels 4 1-1–4 1-m–4 k-1–4 k-n in addition to the function of the database 126 of the seventh embodiment.

The ESL server 1 receives the replacement request from the electronic shelf label. Then, it receives the transmission frequencies from all the electronic shelf labels 4 1-1–4 1-m–4 k-1–4 k-n, stores them in the database 127 and sets the count value i of the counter to "1". Further, it reads electronic shelf label transmission frequency $Z_i$ corresponding to each electronic shelf label i and initial power capacity $B_i$ of the battery 26 from the database 127, reads a preliminarily set power consumption γ in a single transmission processing of the electronic shelf label and obtains the remaining power capacity $P_i$ of the electronic shelf label corresponding to the electronic shelf label number according to $P_i = B_i - \gamma \cdot Z_i$.

The ESL server 1 determines whether or not the remaining power capacity $P_i$ is within a preliminarily set replacement range and if the remaining power capacity $P_i$ is within the replacement range, an electronic shelf label corresponding to an electric shelf label number i is specified as an electronic shelf label which should be replaced.

In this way, the ESL server 1 calculates the remaining power capacity $P_i$ and determines whether or not it is within the replacement range about all the electronic shelf labels and indicates information of an electronic shelf label specified as an electronic shelf label which should be replaced finally on the display 13.

Consequently, the worker replaces a corresponding electronic shelf label with a new one according to electronic shelf label information indicated on the display 13. Alternatively, he replaces the battery of the corresponding electronic shelf label with a new battery.

This replacement is effective in case where power consumption of the battery 26 is more largely affected by a processing for transmitting radio signal to a wireless communication base station than the display 24 and the initial power capacity of the battery 26 is different depending on individual batteries.

In this way, an electronic shelf label in which the remaining power capacity of the battery 26 thereof is short is specified easily based on transmission frequency and the initial power capacity thereof. This specified electronic shelf label is notified through the display 13 of the ESL server 1.

The ESL server 1 does not have to carry out a processing for specifying an electronic shelf label which should be replaced until it receives a replacement request from the electronic shelf label, so that a burden on the ESL server 1 is reduced.

Although this embodiment is described above on an assumption that power consumption γ by a single transmission processing in the respective electronic shelf labels 4 1-1–4 1-m–4 k-1–4 k-n is already known, a case in which the power consumption γ is not known is permitted. That is, the electronic shelf label generates the replacement request when the voltage of the battery 26 drops below a predetermined level. Therefore, the remaining power capacity $P_i$ of the battery 26 when the replacement request is generated from the electronic shelf label is a well known value. Therefore, the ESL server 1 can store this power capacity $P_i$.

If the replacement request is generated from the electronic shelf label, the ESL server 1 obtains power consumption γ by a single transmission processing of the electronic shelf label corresponding to an electronic shelf label number i according to the transmission frequency $Z_i$ received from each electronic shelf label, initial power capacity $B_i$ and preliminarily stored remaining power capacity $P_i$ according to $\gamma=(B_i-P_i)/Z_i$.

Because the power consumption γ by a single transmission processing obtained in this way is basically equal in the same electronic shelf label, this can be used for calculation of the remaining power capacity $P_i$ of all the electronic shelf labels.

Therefore, if the power consumption γ by a single transmission processing is not known, it is possible to specify electronic shelf labels which should be replaced by calculating the remaining power capacity $P_i$ of all the electronic shelf labels.

Although according to this embodiment, the remaining power capacity $P_i$ is calculated from a relation between the electronic shelf label transmission frequency $Z_i$ and initial power capacity $B_i$ by using the power consumption γ by a single transmission processing, the present invention is not restricted to this example, but the remaining power capacity $P_i$ can be calculated from $P_i=B_i-\gamma'\cdot Z_i/n$ with reference to the power consumption γ' by n reception processing (n≧2).

(Ninth Embodiment)

The structure of the electronic shelf label system of this embodiment is basically the same as that of FIG. 1 and the structure of the electronic shelf label is also the same as that of FIG. 2. A different portion is a structure of database provided on the ESL server 1.

As shown in FIG. 16, the database 128 for use here stores production date, installation date, electronic shelf label reception frequency, electronic shelf label transmission frequency and information A-E of each electronic shelf label.

In the electronic shelf labels 4 1-1–4 1-m–4 k-1–4 k-n of this system, electric energy consumed for display processing of the display 24 and transmission/reception processing of radio signal to/from the wireless communication base station affect power consumption largely.

Thus, each of the electronic shelf labels 4 1-1–4 1-m–4 k-1–4 k-n counts reception frequency from the wireless communication base station and transmission frequency to the wireless communication base station and when this counted value is inquired from the ESL server 1, this value is transmitted to the ESL server 1 through a corresponding radio communication base station.

Assuming that in each of the electronic shelf labels 4 1-1–4 1-m–4 k-1–4 k-n, power capacity consumed for display processing per day is δ, power capacity consumed by a single reception processing is β, power capacity consumed in a single transmission processing is γ, number of operating days of the electronic shelf label obtained from date set up in the database 128, electronic shelf label reception frequency is Y and electronic shelf label transmission frequency is Z, total power consumption W of the electronic shelf label is $W=\delta\cdot X+\beta\cdot Y+\gamma\cdot Z$.

Power capacity $W_a$ consumed until the electronic shelf label dispatches the replacement request can be notified at the time of design.

Further, even if in the electronic shelf labels 4 1-1–4 1-m–4 k-1–4 k-n, power capacity δ consumed by a single display processing, power capacity β consumed by a single reception processing and power capacity γ consumed by a single transmission processing are not known, if there are three electronic shelf labels which dispatch the replacement request, the ESL server 1 can obtain power capacity δ consumed by a single display processing, power capacity β consumed by a single reception processing and an power capacity γ consumed by a single transmission processing.

Figure 17:
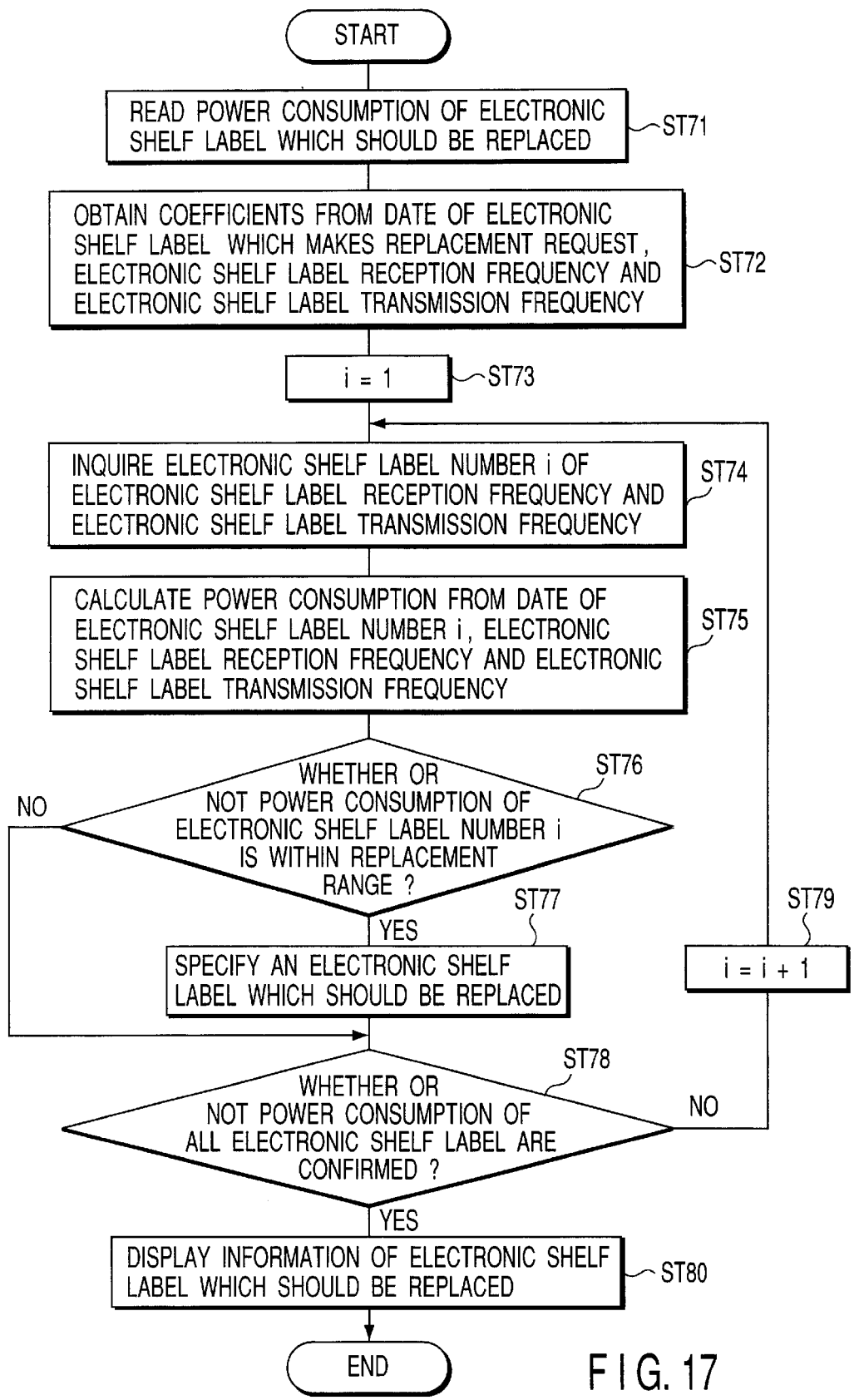
FIG. 17 is a flow chart showing a specific processing of the electronic shelf label by an ESL server according to the ninth embodiment of the present invention.

That is, the ESL server 1 carries out processing for specifying an electronic shelf label as shown in FIG. 17.

If the replacement request is made from each of three electronic shelf labels, in ST71, the ESL server 1 reads power consumption $W_a$ of an electronic shelf label which is to be replaced.

Subsequently, in ST72, the ESL server 1 obtains coefficients of the three electronic shelf labels which make the replacement request according to dates thereof, electronic shelf label reception frequency and electronic shelf label transmission frequency. The coefficients mentioned here are power capacity δ, β, γ.

Assuming that the electronic shelf label numbers of the three electronic shelf labels which make the replacement request are "1", "2" and "3" and the number of operating days thereof are $X_1$, $X_2$ and $X_3$, electronic shelf label reception frequencies are $Y_1$, $Y_2$ and $Y_3$ and electronic shelf label reception frequencies are $Z_1$, $Z_2$ and $Z_3$, power capacities consumed by these three electronic shelf labels are $W_1$, $W_2$ and $W_3$.

$$\delta\cdot X_1+\beta\cdot Y_1+\gamma\cdot Z_1=W_1 \tag{1}$$

$$\delta\cdot X_2+\beta\cdot Y_2+\gamma\cdot Z_2=W_2 \tag{2}$$

$$\delta\cdot X_3+\beta\cdot Y_3+\gamma\cdot Z_3=W_3 \tag{3}$$

where according to this embodiment, $W_1=W_2W_3$.

If the system of linear equations are solved, the ESL server 1 can obtain the coefficients δ, β, γ.

Both sides of the above mentioned equation (1) are divided by $X_1$ so as to obtain an equation (4). Both sides of this equation (4) are multiplied by $X_2$ and this result is subtracted from the equation (2) so as to obtain an equation (5). Further, both sides of the equation (4) are multiplied by $X_3$ and then this result is subtracted from the equation (3) so as to obtain an equation (6).

$$\delta+\beta\cdot Y_1'+\gamma\cdot Z_1'=W_{01} \tag{4}$$

$$\beta\cdot Y_2'+\gamma\cdot Z_2'=W_{02} \tag{5}$$

$$\beta\cdot Y_3'+\gamma\cdot Z_3'=W_{03} \tag{6}$$

Both sides of the above mentioned equation (5) are divided by $Y_2'$ so as to obtain an equation (8). Both sides of this equation (8) are multiplied by $Y_1'$ and then this result is subtracted from the equation (4) so as to obtain an equation (7). Both sides of the equation (8) are multiplied by $Y_3'$ and this result is subtracted from the equation (6) so as to obtain an equation (9).

$$\delta++\gamma\cdot Z_1''=W_{01}' \tag{7}$$

$$\beta+\gamma\cdot Z_2''=W_{02}' \tag{8}$$

$$\gamma\cdot Z_3''=W_{03}' \tag{9}$$

Both sides of the above-mentioned equation (9) are divided by $Z_3''$ so as to obtain an equation (12). Both sides of this equation (12) are multiplied by $Z_1''$ and this result is subtracted from the equation (7) so as to obtain an equation (10). Then, both sides of the equation (12) are multiplied by $Z_2''$, and this result is subtracted from the equation (8) so as to obtain an equation (11).

$$\delta = W_{01}'' \quad (10)$$

$$\beta = W_{02}'' \quad (11)$$

$$\gamma = W_{03}'' \quad (12)$$

By using this procedure, the ESL server 1 can calculate the coefficients $\delta$, $\beta$, $\gamma$ by means of computer. Although the Gauss-Jordan elimination is employed to solve the system of linear equations, it is permissible to calculate the coefficients $\delta$, $\beta$, $\gamma$ by other solution method than this system of linear equations solution method.

Subsequently, in ST73, the ESL server 1 sets the count value i of the counter to "1".

Then, in ST74, the ESL server 1 inquires an electronic shelf label corresponding to an electronic shelf label number 1 about electronic shelf label reception frequency and electronic shelf label transmission frequency. The ESL server 1 receives reception frequency and transmission frequency from this electronic shelf label and stores them in an area for the electronic shelf label reception frequency and electronic shelf label transmission frequency corresponding to the electronic shelf label number i in the database 128.

Subsequently, in ST75, the ESL server 1 calculates power consumption Wi according to date corresponding to the electronic shelf label number i of the database 128, electronic shelf label reception frequency $Y_i$ and electronic shelf label transmission frequency $Z_i$.

This power consumption $W_i$ is calculated by a following equation.

$$W_i = \delta \cdot X_i + \beta \cdot Y_i + \gamma \cdot Z_i \quad (13)$$

Where $X_i$ means the number of operating days of the electronic shelf label corresponding to the electronic shelf label number i.

In ST76, the ESL server 1 checks whether or not power consumption $W_i$ of the electronic shelf label number i is within a preliminarily set replacement object range.

If the power consumption $W_1$, is within the object range, in ST77, the ESL server 1 specifies the electronic shelf label of the electronic shelf label number i as an electronic shelf label which should be replaced. If it is out of the object range, the ESL server 1 omits the processing of ST77.

Subsequently, in ST78, the ESL server 1 checks whether or not power consumption of all the electronic shelf labels are confirmed.

Unless the confirmation of power consumption of all the electronic shelf labels is completed, the ESL server 1 increments the count value i of the counter by 1 in ST79 and then returns to the processing of ST74.

If the confirmation of power consumption of all the electronic shelf labels is terminated, in ST80, the ESL server 1 notifies of information of an electronic shelf label specified as an electronic shelf label which should be replaced through the display 13.

The ESL server 1 may notify the information by printing or indicating it on the indicator of the handy terminal carried by a worker working near a display shelf by sending to the handy terminal by radio.

Therefore, in this case also, the worker can be notified that the battery capacity of the electronic shelf label corresponding to the specified electronic shelf label number is short and then replace the electronic shelf label with a new one. Alternatively, he replaces the battery 26 of the corresponding electronic shelf label with a new battery.

This replacement is very effective in case of using an electronic shelf label in which power consumption of the battery 26 affects display processing of the display 24 and transmission/reception processing to/from the radio communication base station largely.

In this way, an electronic shelf label in which the remaining power capacity of the battery 26 thereof is short is specified easily based on number of operating days, reception frequency and transmission frequency. This specified electronic shelf label is notified through the display 13 of the ESL server 1.

The ESL server 1 does not have to carry out a processing for specifying an electronic shelf label which should be replaced until it receives a replacement request from the electronic shelf label, so that a burden on the ESL server 1 is reduced.

If power capacity $\delta$ consumed by display processing per day in the electronic shelf label, power capacity $\beta$ consumed by a single reception processing and power capacity $\gamma$ consumed by a single transmission processing are known, the ESL server 1 can specify an electronic shelf label which should be replaced by storing these values in a memory unit to be capable of omitting the calculation processing for these values. That is, the ESL server 1 can omit processings of ST71 and ST72 in FIG. 17.

According to the above described embodiment, the ESL server 1 calculates power consumption W from production date or installation date of the electronic shelf label up to current date using power capacity $\delta$ consumed in display processing per day, power capacity $\beta$ consumed by a single reception processing and power capacity y consumed by a single transmission processing. However, the present invention is not restricted to this example. The power consumption W may be calculated by using power capacity consumed by display processing in unit period such as a week and 10 days, power capacity consumed by reception processings of a predetermined time and power capacity consumed by transmission processings of a predetermined time.

(Tenth Embodiment)

The structure of the electronic shelf label system of this embodiment is basically the same as that of FIG. 1 and the structure of the electronic shelf label is also the same as that of FIG. 2. A different portion is a structure of database provided on the ESL server 1.

A database 129 for use here stores the initial power capacities of the batteries 26 provided on the respective electronic shelf labels 4 1-1–4 1-$m$–4 $k$-1–4 $k$-$n$ corresponding to respective electronic shelf label numbers in addition to the function of the database 128 of the ninth embodiment.

If the power capacity $\delta$ consumed by display processing per day of the electronic shelf label, power capacity $\beta$ consumed by a single reception processing and power capacity $\gamma$ consumed by a single transmission processing are known, the ESL server 1 store these values.

Further, the remaining power capacity $P_i$ of the battery 26 when the replacement request is generated is a known value because is set up at the design time. The ESL server 1 stores this value also.

If the ESL server 1 receives a replacement request from an electronic shelf label of the electronic shelf label number i, it reads out date and initial power capacity $B_i$ of a corresponding electronic shelf label number from the database 129.

The ESL server 1 reads out the power capacity $\delta$ consumed in display processing per day, power capacity $\beta$ consumed by a single reception processing and power capacity $\gamma$ consumed by a single transmission processing also.

Further, the ESL server 1 obtains electronic shelf label reception frequency $Y_i$ and electronic shelf label transmission frequency $Z_i$ from a corresponding electronic shelf label.

Then, the ESL server 1 obtains the number of operating days from a read-out date to current date. Consequently, the power capacity $W_i$ consumed up to now can be obtained according to the aforementioned equation (13) and the remaining power capacity $P_i$ of the battery 26 in the electronic shelf label of the electronic shelf label i is $P_i = B_i - W_i$.

Even if the power capacity $\delta$ consumed by display processing per day of the electronic shelf label, power capacity $\beta$ consumed by a single reception processing and power capacity $\gamma$ consumed by a single transmission processing are not known, the ESL server 1 can obtain the respective power capacities $\delta$, $\beta$, $\gamma$ if there are three electronic shelf labels which generate the replacement request.

If the replacement requests are generated from three electronic shelf labels corresponding to the electronic shelf label numbers "1", "2", and "3", the ESL server 1 reads initial power capacities $B_1$, $B_2$, $B_3$ corresponding to the electronic shelf label numbers 1, 2, 3 from the database 129.

The power capacities $W_1$, $W_2$, $W_3$ consumed by the three electronic shelf labels can be obtained from following equations.

$$W_1 = B_1 - P_1 \tag{14}$$

$$W_2 = B_2 - P_2 \tag{15}$$

$$W_3 = B_3 - P_3 \tag{16}$$

The ESL server 1 reads out respective dates from the database 129 and obtains electronic shelf label reception frequencies $Y_1$, $Y_2$, $Y_3$ and electronic shelf label transmission frequencies $Z_1$, $Z_2$, $Z_3$ from corresponding electronic shelf labels. Then, the number of operating days $X_1$, $X_2$, $X_3$ from a read-out date to current date are obtained.

Following equations are established in relations of the power capacities $W_1$, $W_2$, $W_3$ consumed by the three electronic shelf labels.

$$\delta \cdot X_1 + \beta \cdot Y_1 + \gamma \cdot Z_1 = W_1 \tag{17}$$

$$\delta \cdot X_2 + \beta \cdot Y_2 + \gamma \cdot Z_2 = W_2 \tag{18}$$

$$\delta \cdot X_3 + \beta \cdot Y_3 + \gamma \cdot Z_3 = W_3 \tag{19}$$

Therefore, the ESL server 1 can obtain respective power capacities $\delta$, $\beta$, $\gamma$ by solving this system of linear equations.

When the power capacity $\delta$ consumed by display processing per day, power capacity $\beta$ consumed by a single reception processing and power capacity $\gamma$ consumed by a single transmission processing become known, the ESL server 1 can obtain the power consumption $W_i$ consumed by the electronic shelf label of the electronic shelf label number i according to the aforementioned equation (13). Then, the obtained remaining power capacity $P_i$ of the battery 26 in the electronic shelf label is $P_i = B_i - W_i$.

If the remaining power capacities of the batteries 26 in all the electronic shelf labels 4 1-1-4 1-m-4 k-1-4 k-n are obtained, the ESL server 1 compares this power capacity with that out of the replacement object range so as to determine whether it is within or out of the object range. It can specify an electronic shelf label within the object range and notify thereof through the display 13.

Consequently, the worker replaces a corresponding electronic shelf label with a new electronic shelf label according to electronic shelf label information displayed on the display 13. Alternatively, he replaces the battery of the corresponding electronic shelf label with a new battery.

This replacement is very effective in case of using an electronic shelf label in which power consumption of the battery 26 affects display processing of the display 24 and transmission/reception processing to/from the wireless communication base station and the initial power capacity of the battery differs from one to another.

In this way, an electronic shelf label in which the remaining power capacity of the battery 26 thereof is short is specified easily based on number of operating days, initial power capacity, reception frequency and transmission frequency. This specified electronic shelf label is notified through the display 13 of the ESL server 1.

The ESL server 1 does not have to carry out a processing for specifying an electronic shelf label which should be replaced until it receives a replacement request from the electronic shelf label, so that a burden on the ESL server 1 is reduced.

Although according to this embodiment, the power consumption W from the production date or installation date up to a current date is calculated using power capacity $\delta$ consumed by display processing per day, power capacity $\beta$ consumed by a single reception processing and power capacity $\gamma$ consumed by a single transmission processing, the present invention is not restricted to this example. The power consumption W may be calculated by using power capacity consumed by display processing in unit period such as a week and 10 days, power capacity consumed by reception processings of a predetermined time and power capacity consumed by transmission processings of a predetermined time.

Although according to the above described respective embodiments, information of the specified electronic shelf label is displayed on the display 13 of the electronic shelf label, the present invention is not restricted to this example, but it is permissible to transmit data notifying such a replacement to the specified electronic shelf label from ESL server and then for an electronic shelf label which receives that data to change a display content of the display 24 so as to directly notify of that replacement. In this case, as for changing of the display, it is permissible to change the indication to a representation indicating the replacement, change display color or brightness, use blinking pattern or use other display style.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic shelf label system comprising a plurality of electronic shelf labels each having a display for indicating information corresponding to each of displayed products, and an electronic shelf label server for managing each of the electronic shelf labels, wherein:

(i) each of said electronic shelf labels comprises:
   a battery for supplying electric power; and
   a battery control means for supervising the battery and providing said electronic shelf server with a battery replacement request if a power capacity of the battery of one of said electronic shelf labels drops below a predetermined level; and (ii) said electronic shelf label server comprises:
   a database for storing at least one of a production date and an installation date of each of the electronic shelf labels;
   determining means for, when the replacement request is made by one of said electronic shelf labels whose battery capacity has dropped below the predetermined level, determining a replacement object range as all dates before said stored at least one of said production date and said installation date corresponding to an electronic shelf label which made the battery replacement request;

specifying means for specifying electronic shelf labels within the replacement object range determined by said determining means; and output means for outputting information of the electronic shelf labels specified by said specifying means.

2. An electronic shelf label system according to claim 1, wherein:

the output means transmits data notifying the specified electronic shelf labels that the specified electronic shelf labels are to be replaced; and each of the electronic shelf labels which receives the data changes a content of the display to identify the electronic shelf label as a label to be replaced.

3. An electronic shelf label system comprising a plurality of electronic shelf labels each having a display for indicating information corresponding to each of displayed products, wireless communication base stations for communicating with each of the electronic shelf labels, and an electronic shelf label server for managing each of the electronic shelf labels via the wireless communication base stations, wherein:

(i) each of said electronic shelf labels comprises:
　a battery for supplying electric power; and
　a battery control means for supervising the battery and providing said electronic shelf server with a battery replacement request if a power capacity of the battery of one of said electronic shelf labels drops below a predetermined level; and (ii) said electronic shelf label server comprises:
　determining means for, responsive to the replacement request, determining a replacement object range based on a frequency of communication between the wireless communication base stations and the electronic shelf label whose battery capacity has dropped below the predetermined level;
　specifying means for specifying electronic shelf labels within the replacement object range determined by said determining means; and
　output means for outputting information of the electronic shelf labels specified by said specifying means.

4. An electronic shelf label system according to claim 3, wherein:

a plurality of the electronic shelf labels and a plurality of the wireless communication base stations are divided into a plurality of corresponding groups;

the determining means, responsive to the replacement request, identifies the wireless communication base station that communicates wirelessly with the electronic shelf label whose battery capacity has dropped below the predetermined level, and determines the replacement object range based on the frequency of communication of the identified wireless communication base station; and the specifying means specifies other ones of the wireless communication base stations within the replacement object range, and corresponding electronic shelf labels that communicate wirelessly with the specified wireless communication base stations.

5. An electronic shelf label system according to claim 3, wherein:

a plurality of the electronic shelf labels and a plurality of the wireless communication base stations are divided into a plurality of corresponding groups;

a database is provided for storing an initial battery power capacity of each of the electronic shelf labels;

the determining means obtains a transmission frequency of each of the wireless communication base stations, and responsive to the replacement request, reads the battery power capacity of each of the electronic shelf labels from the database, determines a power consumption of each of the electronic shelf labels based on the transmission frequency of the wireless communication base stations that communicate with each of the electronic shelf labels, and then obtains a remaining power capacity from the power consumption and the initial battery power capacity; and the specifying means specifies electronic shelf labels in which the remaining power capacity obtained by the determining means is below a predetermined level.

6. An electronic shelf label system according to claim 3, wherein:

the determining means obtains a frequency of transmission/reception by each of the electronic shelf labels, and responsive to the replacement request, determines an object range of transmission/reception frequency from the transmission/reception frequency of the electronic shelf label whose battery capacity has dropped below the predetermined level; and the specifying means specifies electronic shelf labels falling within the object range of transmission/reception frequency determined by the determining means.

7. An electronic shelf label system according to claim 3, wherein:

a database is provided for storing an initial battery power capacity of each of the electronic shelf labels;

the determining means obtains a transmission frequency of each of the electronic shelf labels, and responsive to the replacement request, reads the initial battery power capacity of each of the electronic shelf labels from the database, determines a power consumption of each of the electronic shelf labels based on the transmission frequencies of the electronic shelf labels, and then obtains a remaining power capacity of each of the electronic shelf labels based on the determined power consumption of each of the electronic shelf labels and the initial battery power capacity of each of the electronic shelf labels; and the specifying means specifies electronic shelf labels in which the remaining power capacity obtained by the determining means is below a predetermined level.

8. An electronic shelf label system according to claim 3, wherein:

a database is provided for storing at least one of a production data and an installation date of each of the electronic shelf labels;

the determining means obtains a transmission frequency of each of the electronic shelf labels, and responsive to the replacement request, reads from the database at least one of the production date and installation date of each of the electronic shelf labels, obtains a first power consumption for each of the electronic shelf labels based on days passing up to a current date for each of the electronic shelf labels, and then obtains a second power consumption for each of the electronic shelf labels based on the transmission frequency of each of the electronic shelf labels; and the specifying means specifies electronic shelf labels whose sum of the first and second power consumptions obtained by the determining means is above a predetermined level.

* * * * *